US012210876B2

(12) United States Patent
Robinson et al.

(10) Patent No.: US 12,210,876 B2
(45) Date of Patent: Jan. 28, 2025

(54) IMPLICIT GLOBAL POINTER RELATIVE ADDRESSING FOR GLOBAL MEMORY ACCESS

(71) Applicant: MIPS Tech, LLC, Santa Clara, CA (US)

(72) Inventors: James Hippisley Robinson, New York, NY (US); Morgyn Taylor, San Jose, CA (US); Matthew Fortune, Otley (GB); Richard Fuhler, San Jose, CA (US); Sanjay Patel, San Ramon, CA (US)

(73) Assignee: MIPS Tech, LLC, San Jose, CA (US)

( * ) Notice: Subject to any disclaimer, the term of this patent is extended or adjusted under 35 U.S.C. 154(b) by 212 days.

(21) Appl. No.: 16/119,291

(22) Filed: Aug. 31, 2018

(65) Prior Publication Data

US 2019/0065201 A1    Feb. 28, 2019

Related U.S. Application Data

(60) Provisional application No. 62/558,930, filed on Sep. 15, 2017, provisional application No. 62/552,855, (Continued)

(51) Int. Cl.
*G06F 9/30* (2018.01)
*G06F 5/01* (2006.01)
(Continued)

(52) U.S. Cl.
CPC ............ *G06F 9/30167* (2013.01); *G06F 5/01* (2013.01); *G06F 9/30014* (2013.01); (Continued)

(58) Field of Classification Search
CPC ............ G06F 9/30167; G06F 9/30014; G06F 9/30192; G06F 9/355; G06F 9/3016; (Continued)

(56) References Cited

U.S. PATENT DOCUMENTS 5,335,333 A * 8/1994 Hinton .................... G06F 9/355
                                                            711/201
6,578,094 B1   6/2003 Moudgill
(Continued)

FOREIGN PATENT DOCUMENTS

WO    WO2017112176 A1    6/2017

OTHER PUBLICATIONS

ARCompact Instruction Set Architecture Programmer's Reference. Datasheet [online]. ARC International, 2008 [retrieved on May 17, 2022]. Retrieved from the Internet: <URL:http://me.bios.io/images/d/dd/ARCompactISA_ProgrammersReference.pdf> pp. 160, 164.*
(Continued)

*Primary Examiner* — Shawn Doman

(57) ABSTRACT

Instruction set architectures (ISAs) and apparatus and methods related thereto comprise an instruction set that includes one or more instructions which identify the global pointer (GP) register as an operand (e.g., base register or source register) of the instruction. Identification can be implicit. By implicitly identifying the GP register as an operand of the instruction, one or more bits of the instruction that were dedicated to explicitly identifying the operand (e.g., base register or source register) can be used to extend the size of one or more other operands, such as the offset or immediate, to provide longer offsets or immediates.

27 Claims, 35 Drawing Sheets

Related U.S. Application Data filed on Aug. 31, 2017, provisional application No. 62/552,830, filed on Aug. 31, 2017, provisional application No. 62/552,841, filed on Aug. 31, 2017, provisional application No. 62/552,796, filed on Aug. 31, 2017.

(51) Int. Cl.
*G06F 9/32* (2018.01)
*G06F 9/34* (2018.01)
*G06F 9/355* (2018.01)
*G06F 9/38* (2018.01)

(52) U.S. Cl.
CPC ...... *G06F 9/30036* (2013.01); *G06F 9/30043* (2013.01); *G06F 9/30112* (2013.01); *G06F 9/30134* (2013.01); *G06F 9/30145* (2013.01); *G06F 9/30149* (2013.01); *G06F 9/3016* (2013.01); *G06F 9/30192* (2013.01); *G06F 9/324* (2013.01); *G06F 9/342* (2013.01); *G06F 9/355* (2013.01); *G06F 9/3861* (2013.01); *G06F 9/30032* (2013.01); *G06F 9/30163* (2013.01)

(58) Field of Classification Search
CPC .. G06F 9/342; G06F 9/30149; G06F 9/30112; G06F 9/3861; G06F 9/30145; G06F 9/30134; G06F 5/01; G06F 9/30036; G06F 9/30043; G06F 9/324; G06F 9/30163; G06F 9/30032; G06F 9/3001
USPC .......................................... 712/41, 210, 225
See application file for complete search history.

(56) References Cited

U.S. PATENT DOCUMENTS

| | | | |
|---|---|---|---|
| 7,051,329 B1 * | 5/2006 | Boggs | G06F 9/30123 |
| | | | 712/E9.027 |
| 7,492,807 B1 * | 2/2009 | Buchmann | G06F 13/4234 |
| | | | 375/130 |
| 7,558,939 B2 | 7/2009 | Banerjee et al. | |
| 7,610,473 B2 | 10/2009 | Kissell | |
| 8,270,552 B1 * | 9/2012 | Oner | H04L 25/05 |
| | | | 375/354 |
| 9,086,906 B2 | 7/2015 | Patel et al. | |
| 9,235,510 B2 | 1/2016 | Patel et al. | |
| 9,652,240 B2 | 5/2017 | Jackson | |
| 9,792,123 B2 | 10/2017 | Manoukian | |
| 9,830,275 B2 | 11/2017 | Rozario et al. | |
| 9,870,225 B2 | 1/2018 | Sudhakar | |
| 2003/0018879 A1 | 1/2003 | Sahraoui et al. | |
| 2003/0161172 A1 | 8/2003 | Civlin | |
| 2003/0225998 A1 * | 12/2003 | Khan | G06F 9/3001 |
| | | | 712/210 |
| 2004/0205409 A1 | 10/2004 | Wu | |
| 2005/0081017 A1 * | 4/2005 | Rupley | G06F 9/30043 |
| | | | 712/208 |
| 2008/0235491 A1 | 9/2008 | Svec et al. | |
| 2013/0024663 A1 | 1/2013 | Plondke et al. | |
| 2013/0246765 A1 | 9/2013 | Arakawa | |
| 2014/0244987 A1 | 8/2014 | Garbacea et al. | |
| 2014/0250289 A1 | 9/2014 | Pota et al. | |
| 2014/0324868 A1 * | 10/2014 | Li | G06F 16/35 |
| | | | 707/737 |
| 2015/0160981 A1 | 6/2015 | Wang et al. | |
| 2016/0179534 A1 | 6/2016 | Xekalakis et al. | |
| 2017/0249147 A1 * | 8/2017 | Gschwind | G06F 9/30032 |
| 2018/0232182 A1 * | 8/2018 | Suzuki | H03M 7/30 |

OTHER PUBLICATIONS

Collins J. et al, "Pointer cache assisted prefetching", Proc. 35th AnnuaiiEEE/ACM International Symposium on Microarchitecture Nov. 18-22, 2002, pp. 62-73.

\* cited by examiner

IMPLICIT GLOBAL POINTER RELATIVE ADDRESSING FOR GLOBAL MEMORY ACCESS

RELATED APPLICATIONS

This application claims the benefit of U.S. provisional patent applications "Implicit Global Pointer Relative Addressing for Global Memory Access" Ser. No. 62/552,855, filed Aug. 31, 2017, "Unified Logic" Ser. No. 62/552,796, filed Aug. 31, 2017, "Pointer-Size Controlled Instruction Processing" App. No. 62/552,841, filed Aug. 31, 2017, "Saving and Restoring Non-Contiguous Blocks of Preserved Registers" Ser. No. 62/552,830, filed Aug. 31, 2017, and "Unaligned Memory Accesses" Ser. No. 62/558,930, filed Sep. 15, 2017. Each of the foregoing applications is hereby incorporated by reference in its entirety.

FIELD OF ART

This application relates generally to memory access and more particularly to implicit global pointer relative addressing for global memory access.

BACKGROUND

When a program is being executed by a computer, the program will typically access (i.e., read or write) data stored in global memory. This requires obtaining, or generating, the address in global memory where the data is or will be stored and reading data from, or writing data to, that address. How this is implemented in the executable code representing the program depends on the addressing mode or modes supported by the instruction set architecture (ISA) implemented by the computer running the program. Example addressing modes include, but are not limited to, displacement addressing, program counter (PC) relative addressing, constant pool addressing, and global pointer (GP) relative addressing.

In ISAs that implement displacement addressing, the memory address to which the data is written to or read from cannot be directly referred to in a memory access instruction (e.g., load instruction or store instruction) due to the limited size of the instructions, so the address is obtained by adding a displacement or offset to the contents of a base register. Accordingly, in these architectures, loading global data from, or storing global data to, memory is typically implemented by two executable instructions: an instruction to set the value of the base register and an instruction to read the data from, or write the data to, the address generated from the base register and a specified offset. Where the base register is 32 bits and the offset is 16 bits, the first instruction may load the most significant 16 bits of the address into the base register and the second instruction may load data from, or store data to, the address generated from the combination of the base register and a specified offset representing the least significant bits of the address.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are ISAs and data processing apparatus and methods related thereto that comprise an instruction set that includes one or more instructions which implicitly identify the GP register as an operand (e.g., base register or source register) of the instruction. By implicitly identifying the GP register as an operand of the instruction, one or more bits of the instruction that were dedicated to explicitly identifying the operand (e.g., base register or source register) can be used to extend the size of one or more other explicitly identified operands, such as the offset or immediate, to provide longer offsets/immediates.

A method of decoding instructions is disclosed comprising: receiving, at a decode unit, an instruction for execution by an execution unit of the data processing apparatus that specifies an operation to be performed, the received instruction being an instruction from an instruction set comprising one or more instructions that implicitly identify a global pointer (GP) register as an operand of the instruction, the GP register storing an address of global memory in which data is stored; decoding, at the decode unit, the received instruction to determine whether the received instruction is one of the one or more instructions that implicitly identify the GP register as an operand of the instruction; and outputting one or more control signals to cause the execution unit to perform the specified operation with the GP register as an operand when the determination is positive.

Embodiments include a data processing apparatus comprising: a register file comprising a GP register, the GP register configured to store an address of global memory in which data is stored; an execution unit; and a decode unit configured to: receive an instruction for execution by the execution unit that specifies an operation to be performed, the received instruction being an instruction from an instruction set comprising one or more instructions that implicitly identify a GP register as an operand of the instruction; determine whether the received instruction is one of the one or more instructions that implicitly identify the GP register as an operand of the instruction; and output one or more control signals to cause the execution unit to perform the specified operation with the GP register as an operand when the determination is positive.

The data processing apparatus may be embodied in hardware on an integrated circuit. There may be provided a method of manufacturing, at an integrated circuit manufacturing system, the data processing apparatus. There may be provided an integrated circuit definition dataset that, when processed in an integrated circuit manufacturing system, configures the system to manufacture the data processing apparatus. There may be provided a non-transitory computer readable storage medium having stored thereon a computer readable description of a data processing apparatus that, when processed in an integrated circuit manufacturing system, causes the integrated circuit manufacturing system to manufacture an integrated circuit embodying the data processing apparatus. The data processing apparatus may be implemented as part of and/or referred to as a processor, a processor chip, a processor module, and so on.

Various features, aspects, and advantages of various embodiments will become more apparent from the following further description.

BRIEF DESCRIPTION OF THE DRAWINGS

The following detailed description of certain embodiments may be understood by reference to the following figures, wherein.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 1:
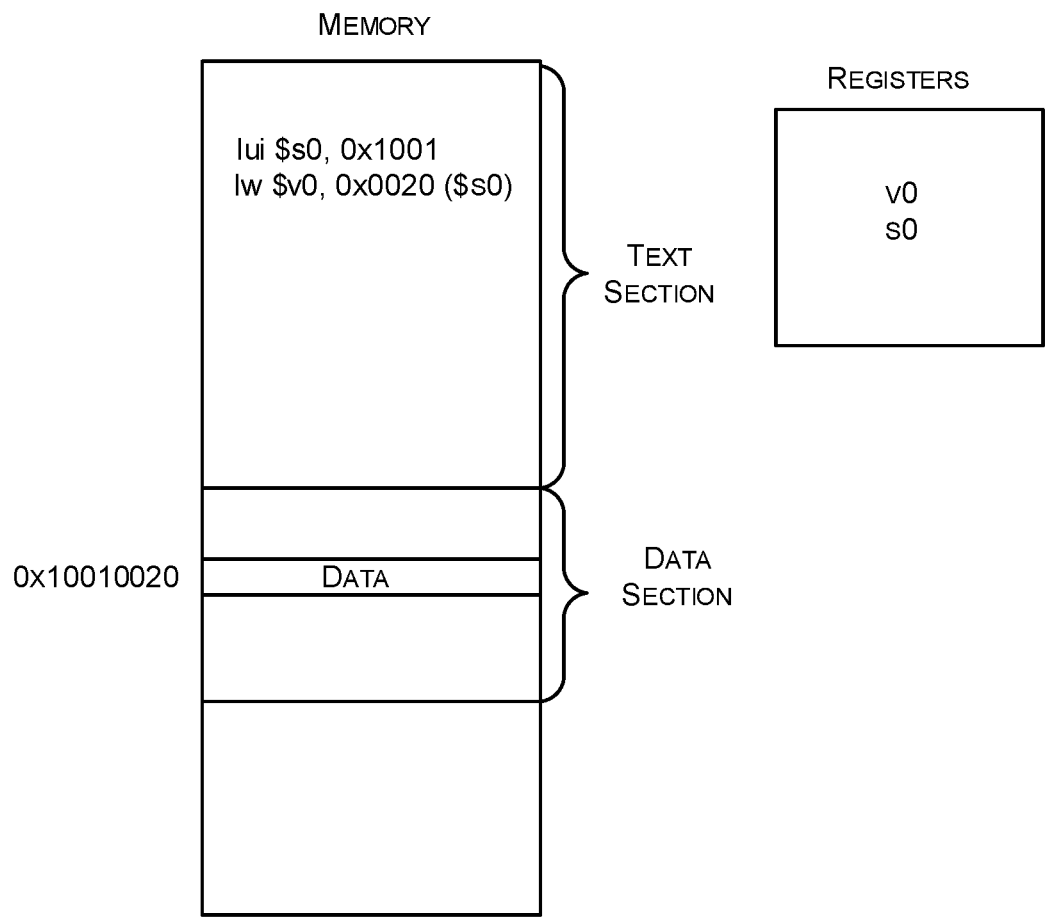
FIG. 1 is a schematic diagram of a known implementation of an ISA that uses displacement addressing.

FIG. 1 is a schematic diagram illustrating an example implementation of an ISA that uses displacement addressing. In this example, the following set of executable instructions may be used to load the word at address 0x10010020 into register $v0, where "0x" indicates a hexadecimal number:

lui $s0, 0x1001
  lw $v0, 0x0020($s0)

The first instruction (a load upper immediate instruction) loads 0x1001 into the upper 16 bits of register $s0 and the second instruction (a load word instruction) loads the word at the memory address formed by the contents of register $s0 (0x10010000) and the offset (0x0020) into register $v0. However, in programs with a significant number of global data accesses, having two instructions per data access makes the compiled code significantly larger and slower.

In an attempt to address this issue, some ISAs have implemented PC relative addressing. In PC-relative addressing, addresses are calculated by applying an offset (e.g., a 16-bit offset) to the program counter. In other words, the program counter is used as the base address. However, in many cases, data is stored separately from the code (or text) of the program and is not within the offset range of the program counter.

Furthermore, PC-relative addressing allows at least load instructions (and potentially store instructions) to access the section of memory where executable code is stored (e.g., the text or instruction section) which is not scalable to systems that support virtual memory and where the operating system applies page-based protection. This is because page-based protection will first enable pages that include executable instructions as execute-only (it may be a security hazard otherwise). A load access of such a page will cause an exception requiring the operating system to enable permissions for reads (and potentially writes). This operation is expensive and thus PC-relative addressing is often limited to embedded systems where all code operates in kernel mode and thus is assumed to be trusted.

To address at least some of the limitations of PC-relative addressing for global data access, some ISAs have implemented constant pool addressing. In constant pool addressing the addresses of global data values are placed in a constant pool which is located near the memory access instruction (e.g., the addresses of global data values are stored in the text section used to store the executable code). Constant pool addressing, however, also typically requires two instructions per data access: an instruction to load the address from memory, and an instruction to perform a load or store of data at that address.

Figure 2:
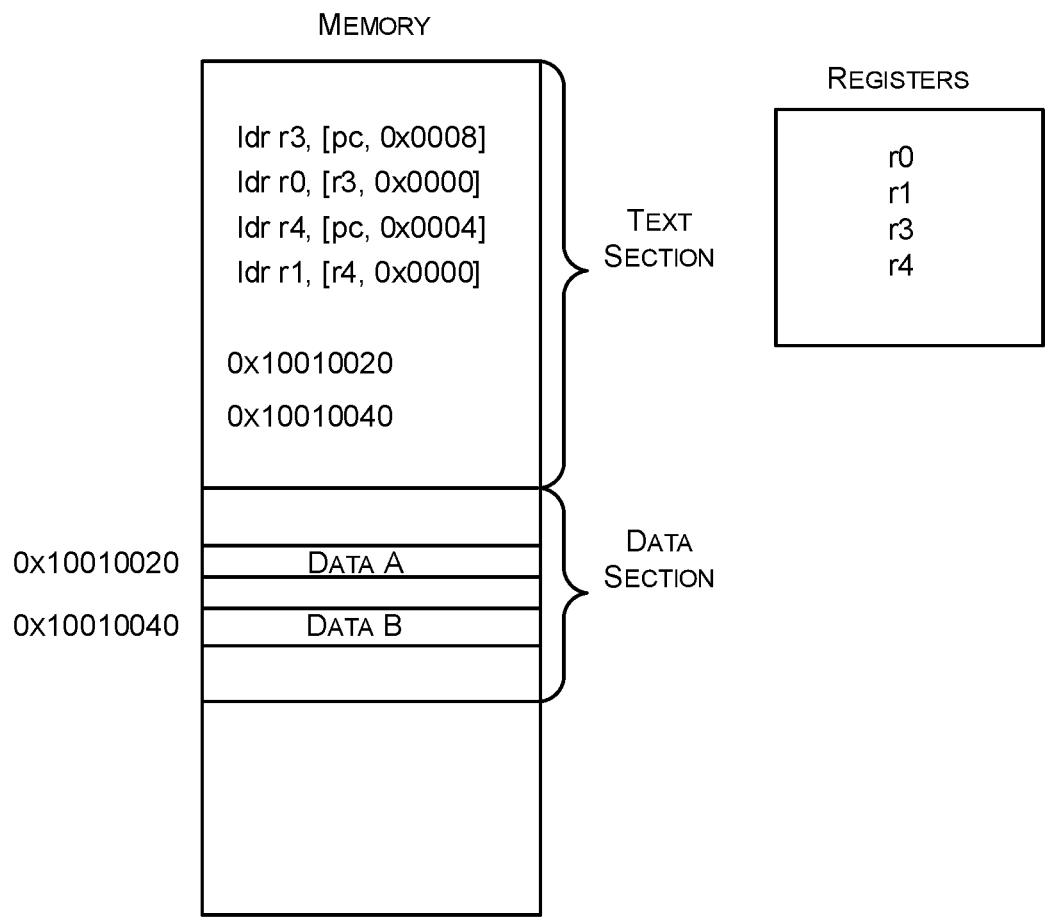
FIG. 2 is a schematic diagram of a known implementation of an ISA that uses constant pool addressing.

FIG. 2 is a schematic diagram illustrating an example implementation of an ISA that uses constant pool addressing. In this example, the following set of instructions may be used to load the word at address 0x10010020 into register 0 (r0) and to load the word at address 0x10010040 into register 1 (r1):

ldr r3, [pc, 0x0008]
ldr r0, [r3, 0x0000]
ldr r4, [pc, 0x0004]
ldr r1, [r4, 0x0000]

The PC register in this particular ISA is read as the program counter plus 8, and so the first instruction loads the word at the address generated from the program counter+8+0x0008 into register 3 (r3), the second instruction loads the word at the memory address formed by the contents of register 3 (r3) (0x10010020) and the offset zero (0x0000) into register 0 (r0), the third instruction loads the word at the address generated from the program counter+8+0x0004 into register 4 (r4), and the fourth instruction loads the word at the memory address formed by the contents of register 4 (r4) (0x10010040) and the offset of zero (0x0000) in register 1 (r1).

In some architectures, constant pool addressing may be improved by identifying (e.g., by the compiler) common base addresses for a set of memory locations to reduce the number of addresses stored in the constant pool and to reduce the number of address loads performed. Specifically, identifying a single common base address means that a single address is stored in the constant pool yet multiple data items can be accessed via that address.

Figure 3:
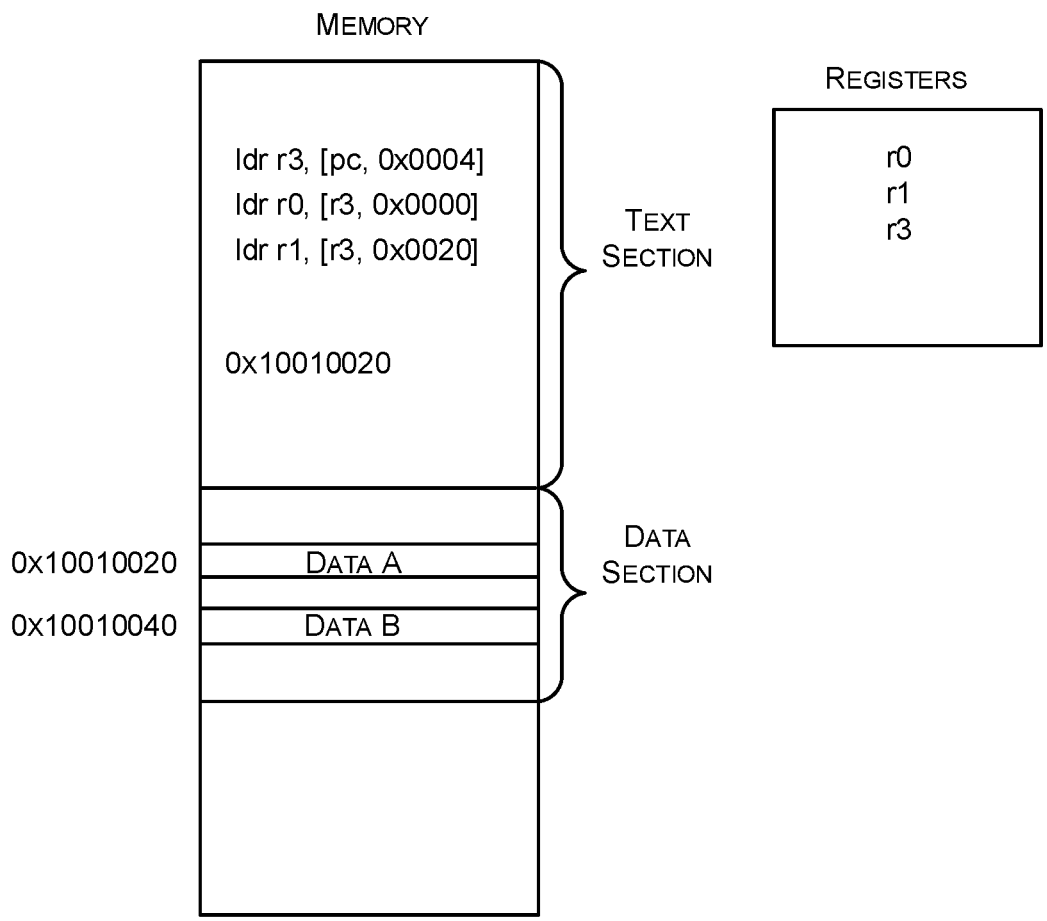
FIG. 3 is a schematic diagram of a known implementation of an ISA that uses constant pool addressing with common base addresses.

FIG. 3 is a schematic diagram illustrating an example implementation of an ISA that uses constant pool addressing with common base addresses. In this example, the following is a set of instructions to (i) load the word at address 0x10010020 into register r0; and (ii) load the word at address 0x10010040 into register r1 wherein the address 0x10010020 is stored at 0x000c offset from the first instruction:

ldr r3, [pc, 0x0004]
ldr r0, [r3, 0x0000]
ldr r1, [r3, 0x0020]

The first instruction loads the word at the address generated from the program counter+8+0x0004 into register 3 (r3), the second instruction loads the word at the memory address formed by the contents of register 3 (r3) (0x10010020) and the offset (0x0000) into register 0 (r0), and the third instruction loads the word at the memory address formed by the contents of register 3 (r3) (0x10010020) and the offset of (0x0020) in register 1 (r1). Accordingly, the common address only needs to be loaded once and then can be used in multiple subsequent load instructions to access data near that address. However, this still requires an initial load of the common address from memory and subsequently the number of addresses that can be accessed from the common address is limited by the offset size.

Other ISAs have attempted to address shortcomings of other addressing techniques by implementing what is referred to as GP relative addressing. In GP relative addressing, a register, referred to as the GP register ($gp) (which may be register 28 in some implementations) is configured to point to an address in global memory. By using the GP register as the base register, the data within the offset range of this memory address can be accessed with a single load or store instruction. For example, where the offset is a signed 16-bit number, a single load or store instruction can be used to access the 64 KB address space defined by, for example, the 32 KB addresses above the GP address and the 32 KB addresses below the GP address.

Figure 4:
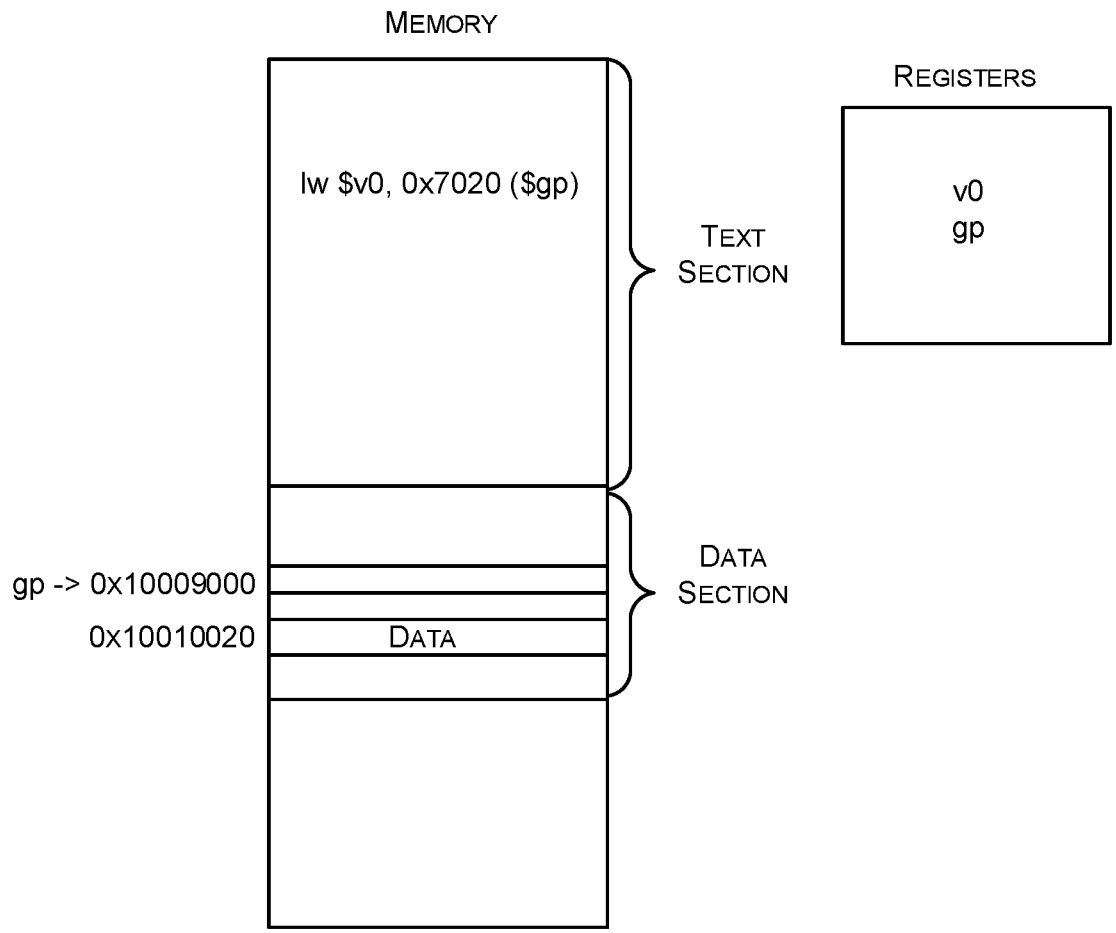
FIG. 4 is a schematic diagram of a known implementation of an ISA that uses GP relative addressing.

FIG. 4 is a schematic diagram illustrating an example implementation of an ISA that supports GP relative addressing. In this example, the GP register is set to 0x10009000, which allows the word at address 0x10010020 to be loaded into register $v0 via the GP register ($gp) using the following single instruction:

lw $v0, 0x7020($gp)

This makes accessing memory locations in the offset range (e.g., 64 KB range) around the GP faster than accessing it from most other memory locations. Furthermore, since the GP register can be set to any value, GP relative addressing is much more flexible than PC relative addressing. Specifically, GP relative addressing allows addresses farther away from the program counter to be more easily and efficiently accessed.

Where GP relative addressing is supported, typically the compiler is configured to store global variables (with a known size) and constants in a single memory region, and then, at load time, the GP register is set to point to the middle of this region. So long as all these data items together take up no more than the offset range (e.g., 64 KB), all of these data items can be accessed with a single instruction via the GP. However, to effectively use a GP register, the compiler must know at compile time that a data item will end up being in a location that is within the offset range (e.g., 64 KB range) of the GP. In practice, compilers typically cannot guarantee this to be the case. Ideally, all of the global variables would be stored in this memory region and accessed via offsets to the GP, but typically the size of the global variables well exceeds the offset range (e.g., 64 KB range). Accordingly, the usual practice is to put small global data items (e.g., data items that are eight bytes or less) in the GP area, but the small global data items may nonetheless exceed the offset range (e.g., 64 KB range). Any global data item that does not fall within the offset range may then require two or more instructions to access.

The embodiments described below are provided by way of example only and are not limiting of implementations which solve any or all of the disadvantages of known architectures for accessing global data items.

As described above, the addressing methods implemented by known ISAs result in executable code that comprises multiple instructions to perform a significant number of global data accesses, either because known ISAs only support an addressing mode, such as displacement addressing or constant pool addressing, which requires two or more executable instructions to implement a memory access; or because known ISAs support an addressing mode, such as PC-relative addressing or GP-relative addressing, that allow a region of memory to be accessed via a single executable instruction, but the number of memory addresses that fall in this region is limited and thus there are a significant number of global data items that fall outside this region and therefore require two or more executable instructions to access. For example, as described above, where GP-relative addressing is supported, the $2^X$ region around the GP address can be accessed with a single instruction that applies an offset to the GP register wherein X is the size (e.g., number of bits) of the offset. For example, where X=16, then the 64 KB region around the GP can be accessed with a single instruction that applies an offset to the GP register. Ideally all of the global data variables are placed in this region. However, it has been shown that in many applications that the total size of the global data variables/items well exceeds 64 KB, thus there are a significant number of global data variables/items that cannot be placed in this region and therefore require two or more executable instructions to access.

Accordingly described herein are ISAs, apparatus, and methods related thereto that comprise an instruction set that includes one or more instructions which identify the GP register as an operand of the instruction. The identification can be performed wherein the one or more instructions that identify a global pointer register as an operand of the instruction make the identification implicitly. This is in contrast to known ISAs that implement GP relative addressing via instructions that explicitly identify the GP register ($gp) as an operand of the instruction. By implicitly identifying the GP register as an operand of the instruction, one or more bits of the instruction that were dedicated to explicitly identifying the GP as an operand can be used to extend the size of one or more other operands of the instruction, such as the offset or immediate. The one or more instructions that implicitly identify the GP register as an operand of the instruction may be referred to as the GP relative instructions and may comprise one or more displacement memory access instructions that implicitly identify the GP register as the base register, and/or one or more register arithmetic instructions that implicitly identify the GP register as the source register. It should be noted that a complete suite of GP relative instructions allows unified PIC support for application processors under Linux, and that increased code-density on embedded processors under one common instruction set is possible.

A displacement memory access instruction (e.g., a displacement store instruction or a displacement load instruction that identifies an address via an offset from a base register) that implicitly identifies the GP register as the base register can have an extended offset range compared to displacement memory access instructions where any register, including the GP register, can be explicitly identified as the base register (which is referred to herein as a generic displacement memory access instruction). For example, if a generic displacement memory access instruction (e.g., displacement load instruction or displacement store instruction) uses sixteen bits to specify an offset and five bits to identify the base register, then a 64 KB ($2^{16}$) range of addresses can be accessed from the base register (e.g., GP register) via the offset. If, however, the GP register ($gp) is implicitly identified as the base register by, for example, the opcode, one or more of the five bits that were previously used to identify the base register can be used to extend the offset length so as to extend the range of addresses that can be accessed from the GP via the offset. For example, if all five bits that were previously used to identify the base register are applied to the offset, this would extend the offset to twenty-one bits which extends the range of addresses that can be accessed from the GP via the offset by a factor of $2^5$ to 2 MB ($2^{21}$). Extending the range of addresses that are accessible from the GP via the offset reduces the number of global data items in memory that fall outside this range, and thus requires two or more instructions to access. This may increase the efficiency and code density of the program.

Similarly, a register arithmetic instruction (e.g., an instruction that adds an immediate to a value in a source register) that implicitly identifies the GP register as the source register can have an extended immediate range compared to register arithmetic instructions where any register, including the GP register, can be explicitly identified as the source register (which is referred to herein as a generic register arithmetic instruction). For example, if a generic register arithmetic instruction uses 16 bits to specify the immediate and five bits to identify the source register, then the range of immediate values that can be applied to the register value is 64 KB ($2^{16}$). If, however, the GP register ($gp) is implicitly identified as the source register by, for example, the opcode, one or more of the five bits that were previously used to explicitly identify the source register can be used to extend the immediate field. For example, where all five bits are added to the immediate, the number of possible immediate values is extended by a factor of $2^5$ to 2 MB; and where only three bits are added to the immediate, the number of possible immediate values is extended by a factor of $2^3$ to 262 KB. Extending the number of possible immediate values increases the number of addresses that can be calculated from the GP register via a single register arithmetic instruction. This may increase the efficiency and code density of the program.

As is known to those of skill in the art, the term "code density" describes the amount of space that the executable code for a program takes up in memory. This may also be referred to as the "memory footprint" of the program. The denser the code, the less space the code takes up in memory. Conversely, the less dense the code, the more space the code takes up in memory. The code density of a program is a function of the ISA implemented by the data processing apparatus that is used to execute the program and is typically based on the number of instructions required to perform each action of the program and the number of bits per instruction. Generally, the fewer instructions it takes to perform actions and the less bits per instruction, the denser the code. Code density is particularly important when the program is to be executed by a data processing apparatus with a limited amount of memory, such as a mobile telephone or other embedded systems.

RISC (reduced instruction set computer) ISAs, which generally have a smaller instruction set compared to CISC (complex instruction set computers) ISAs, generally produce programs with poorer code density because RISC ISAs will often require multiple simple instructions to perform the action(s) performed by one complex instruction in a CISC ISA. However, data processing apparatus, such as CPUs, that implement CISC ISAs typically run at slower clock speeds than data processing apparatus that implement RISC ISAs because the maximum clock period is dictated by the slowest step of the pipeline and more complex instructions tend to be slower. Although it may seem counter-intuitive to dedicate a set of instructions in the limited instruction set of a RISC ISA to perform an action that can be performed by another instruction (e.g., an equivalent generic instruction) in the set, a RISC ISA that includes one or more instructions that implicitly identify the GP register as an operand of the instruction (i.e., GP relative instructions) has proven to produce code that has significantly improved code density. Since global data access is a common operation in most programs, this is particularly true where the one or more instructions that implicitly identify the GP register as an operand of the instruction are memory access instructions. As described above, memory access instructions that use the GP register as the base register allow a significant portion of global data to be accessed via a single memory access instruction.

Since the GP-relative instructions of the described ISA are not intended to be used to access data in the section of memory in which executable instructions are stored (e.g., the text or instruction section), the ISA does not suffer from the same problem as traditional PC-relative addressing which is used to access data that is stored in the section of memory in which the executable instructions are stored (e.g., the text or instruction section). Accordingly, the ISA, apparatus and methods described herein allow implementations that scale from real-time operating systems (RTOS) with a fixed memory mapping to systems, such as Linux®, that support virtual memory.

Figure 5:
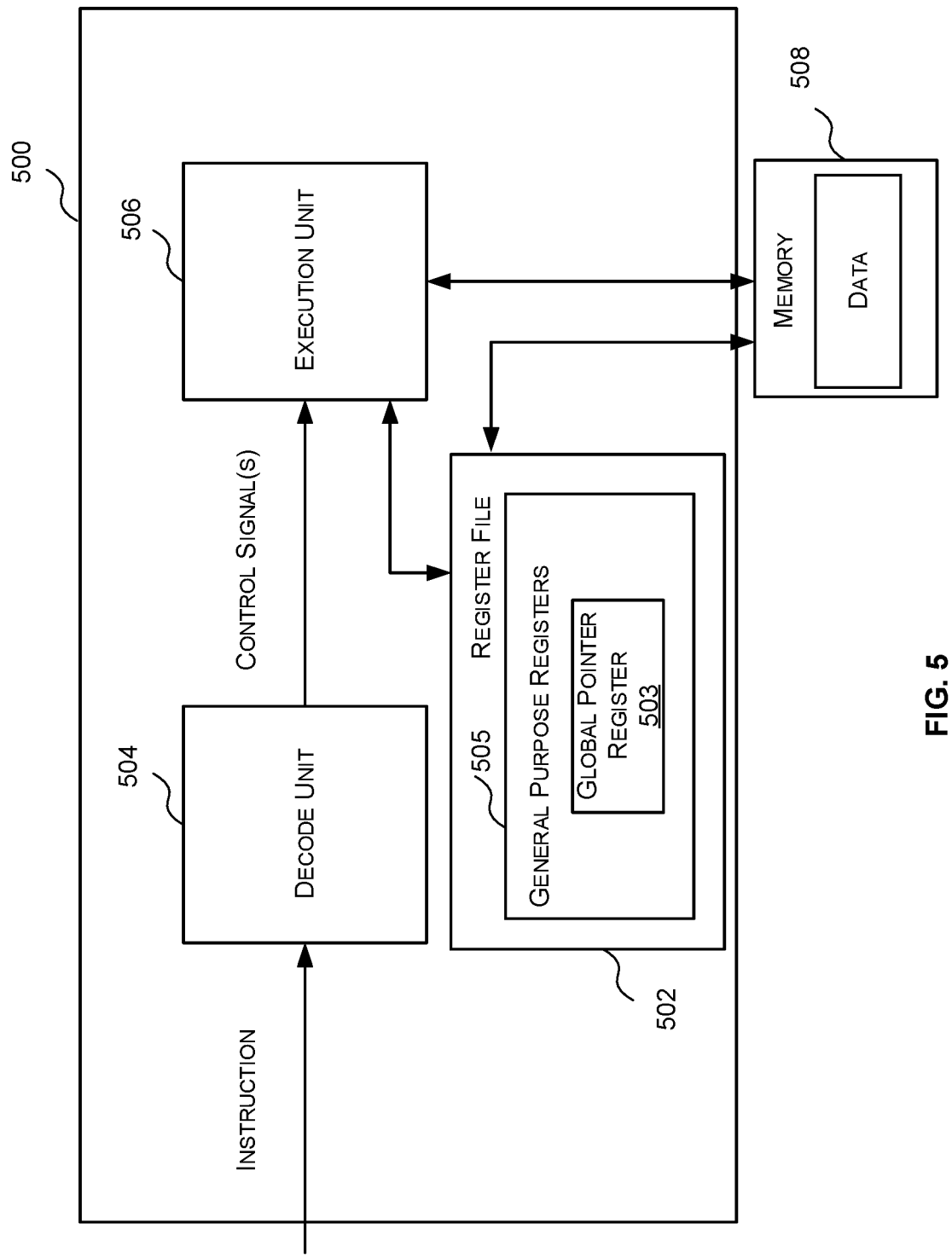
FIG. 5 is a block diagram of an example data processing apparatus configured to implement an ISA with an instruction set comprising one or more instructions that implicitly identify the GP register an operand of the instruction.

Reference is now made to FIG. 5 which illustrates an example data processing apparatus 500 that implements the modified ISA described herein that comprises an instruction set with one or more instructions that implicitly identify the GP register as an operand of the instruction. A data processing apparatus is any device, machine, or dedicated circuit, such as, but not limited to, a processor, computer, or computer system, with processing capability such that it can execute instructions. A processor may be any kind of general-purpose or dedicated processor, such as a CPU, GPU, a System-on-chip, a state machine, a media processor, an application-specific integrated circuit (ASIC), a programmable logic array, a field-programmable gate array (FPGA), or the like. A computer or computer system may comprise one or more processors.

The data processing apparatus 500 of FIG. 5 comprises a register file 502, a decode unit 504, and an execution unit 506. It will be evident to a person of skill in the art that the data processing apparatus 500 of FIG. 5 may comprise other components that are not shown such as, but not limited to, a fetch unit and input/output interface(s).

The register file 502 comprises a plurality of registers which can be written to, and read from, by the execution unit 506. The plurality of registers comprises a GP register 503, one or more general-purpose registers 505 and/or one or more floating point registers (not shown). The GP register 503 is a register that is configured to point to an address in memory that contains data (as opposed to code) to aid in accessing data in memory. The GP register may be a dedicated register separate from the general-purpose registers 505, or, as shown in FIG. 5, may be a specific general-purpose register (e.g., register 28 in some systems) which has been defined (e.g., by software convention or the ISA) as the register used to store the GP address. How the GP register is set-up and used to access data in memory may differ based on the type of code being run on the data processing apparatus. In particular, the use and contents of the GP register may depend on whether the code is position independent code; or regular, non-position-independent (or position dependent code).

Figure 6:
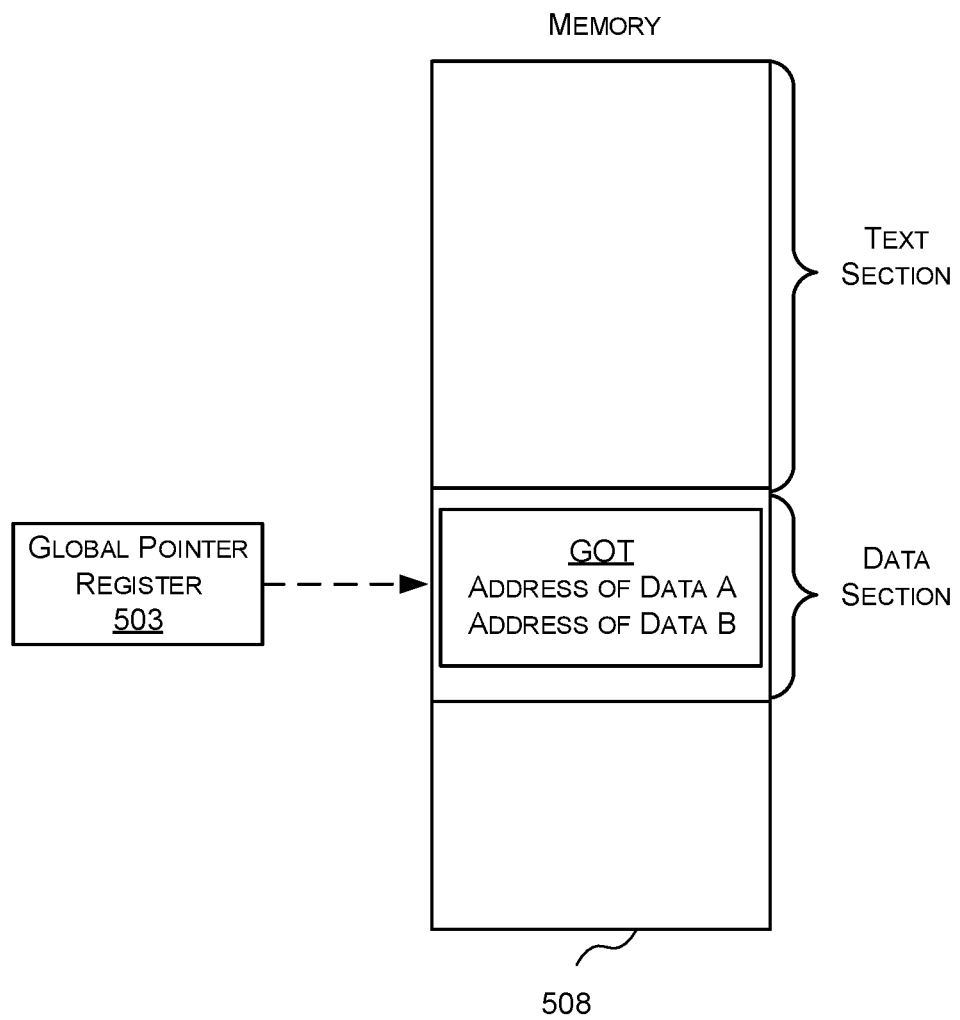
FIG. 6 is a schematic diagram illustrating use of the GP register of FIG. 5 for position independent code.

Position independent code (PIC) which is used, for example, in Linux® applications, is code that executes properly regardless of its absolute address. Accordingly, PIC code can be executed at any memory address without modification. This differs from regular, non-PIC code which can only be run from a particular memory location. Data references from PIC code are typically made indirectly through a global offset table (GOT) which stores the addresses of all accessed global variables and constants. PIC functions that access global data typically start by calculating the address of the GOT given the current program counter value. In these cases, as shown in FIG. 6, the GP register 503 may be configured to store the calculated address of the GOT to allow easy access to the entries of the GOT. The GP value is typically only set once at the beginning of a PIC function and is invariant throughout the remainder of the function.

Figure 7:
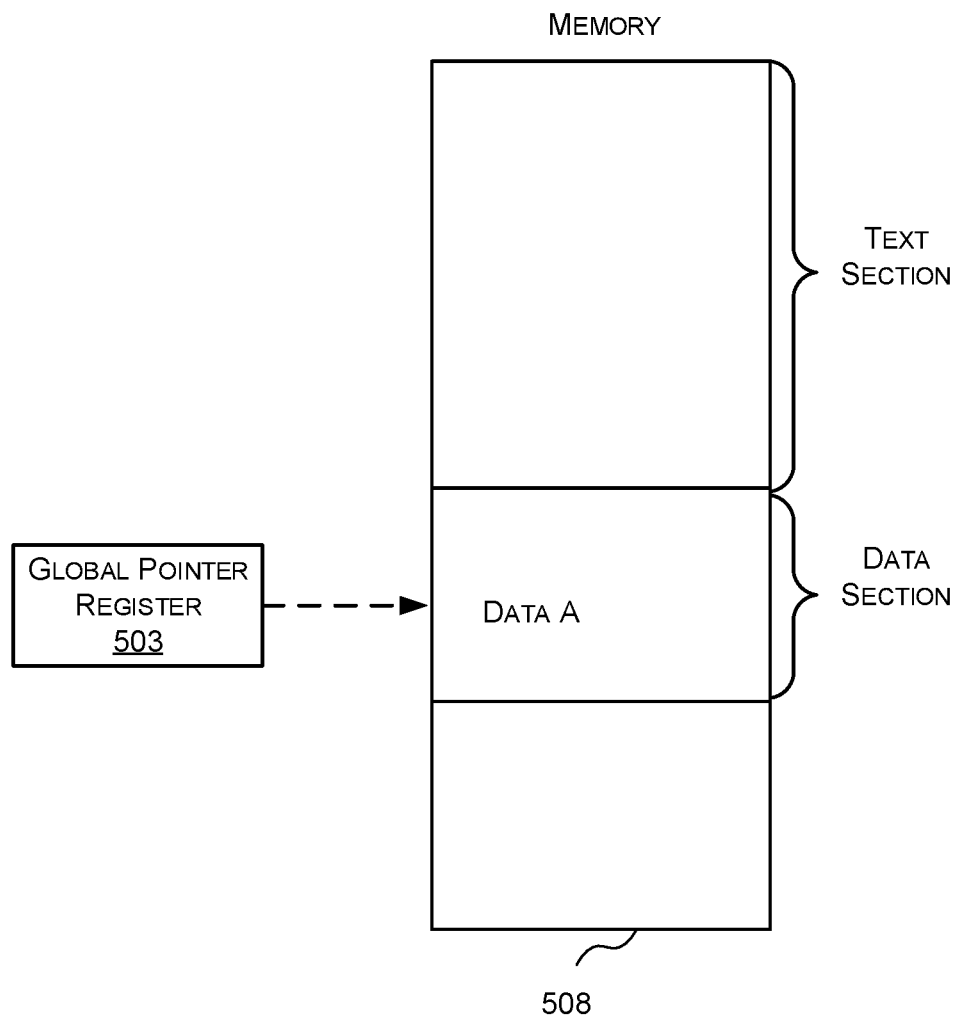
FIG. 7 is a schematic diagram illustrating use of the GP register of FIG. 5 for non-position-independent code.

In contrast, when regular non-PIC code is run on the data processing apparatus, the GP register 503 may be configured, as shown in FIG. 7, to point to a region of memory 508 used to store global variables and constants. Global variables and constants are variables and constants that are globally available, i.e., variables and constants that can be seen by two different calls to the same function and that can be seen by two calls to different functions. The region of memory used to store global variables may, in some cases, also be used to store static data. Static data is data that can be seen by two different calls to the same function, but cannot be seen by calls to different functions.

In some cases, the GP register may be set, at load-time, to an address at the center of the region of memory used to store global variables and constants. For example, when the offset specified by displacement load and store instructions is a signed offset, the GP may be set to an address at the center of the region of memory used to store global variables and constants since the signed offset allows both the $2^{X-1}$ addresses above the GP and the $2^{X-1}$ addresses below the GP to be accessed via the offset. In other cases, the GP register 503 may be set to point to the beginning or the end of that region of memory 508. For example, when the offset specified by displacement load and store instructions is an unsigned offset, the GP may be set to an address at the start (bottom) of the region of memory used to store global variables and constants since the unsigned offset allows the $2^X$ addresses above the GP to be accessed via the offset. In some cases it may be advantageous to use unsigned offsets rather than signed offsets because (i) it allows the hardware implementation of the execution unit 506 that executes displacement load and store instructions to be simpler or less complex since the execution unit 506 does not have to sign extend the offset; and (ii) it is conceptually simpler to have the GP point to the base of the data section, as opposed to the middle of the data section, which makes writing code for such a system easier.

For regular non-PIC code, the GP register may be set to a specific address (e.g., the middle, end or start of the region of memory used to store global variables and constants) once at the beginning of a program. The specific address that the GP is set to may be determined at program build-time and may be based on one or more user-specified parameters. For example, the user may configure the data section to be at a specific address.

The decode unit 504 is configured to receive computer executable instructions representing a program or subroutine that are based on an instruction set comprising one or more instructions that implicitly identify the GP register as an operand of the instruction. The computer executable instructions may be provided to the decode unit 504 by a fetch stage (not shown) that is configured to fetch instructions of a program or subroutine (in program/subroutine order) in memory as indicated by a PC. Each instruction identifies an operation or task (e.g., load, store, add, subtract, jump, branch) to be performed and none, one or more than one operand on which the operation is to be performed. As is known to those of skill in the art, an operand identifies data that is to be operated on or manipulated by the instruction. An operand can be a value within the instruction itself (e.g., an explicitly identified immediate or offset), a register, a memory location or an I/O port. The decode unit 504 is configured to decode each received instruction to identify the operation to be performed and the operand(s) of the operation and to output one or more control signals which causes the execution unit 506 to perform the operation identified by the received instruction using the identified operand(s). Outputting the one or more control signals may be referred to herein as providing the decoded instructions to the execution unit 506 for execution.

The decode unit 504 of FIG. 5 is configured to, in response to receiving an instruction that implicitly identifies the GP register as an operand of the instruction, output one or more control signals that cause the execution unit 506 to perform the identified operation with the GP register as an operand of the instruction. In contrast, the decode unit 504 is configured to, in response to receiving an instruction that explicitly identifies a particular register (e.g., by number) as an operand of the instruction, output one or more control signals to cause the execution unit 506 to perform the specified operation with the explicitly identified register as an operand of the instruction.

The decode unit 504 may be configured to identify instructions that implicitly identify the GP register as an operand of the instruction based on the bit pattern of the received instruction. For example, each instruction that implicitly identifies the GP register as an operand of the instruction may have a unique recognizable bit pattern (e.g., certain bits of the instruction have a recognizable pattern) that identifies it as an instruction that implicitly identifies the GP register as an operand of the instruction. For example, in some cases each instruction that implicitly identifies the GP register as an operand of the instruction may have a unique opcode. As is known to a person of skill in the art, the opcode of an instruction are the bits of the instruction that identify the type of operation to be performed.

The one or more instructions that implicitly identify the GP register as an operand of the instruction may comprise one or more displacement memory access instructions that implicitly identify the GP register as the base register. A memory access instruction causes data to be read from memory or written to memory. Memory access instructions include load instructions and store instructions. A load instruction is an instruction that causes the execution unit 506 to read data from an address of memory 508 and store the read data to a register in the register file 502. A store instruction is an instruction that causes the execution unit 506 to write data in a register in the register file 502 to an address of memory 508. A displacement memory access instruction identifies the address of memory to be read from (in a load) or written to (in a store) through the combination of a base register and an offset. As described above, where addresses are identified using a base register and an offset, two instructions are typically required to perform a memory access: a first instruction to set the value of the base register and a second load/store instruction to apply an offset to the base register and read/write the data from/to memory.

As described above, to minimize the number of memory accesses which require multiple instructions to implement, some ISAs have introduced GP relative addressing wherein the GP register is used as the base register in displacement addressing. Since the GP register is configured to point to an address of memory (e.g., the GOT address or an address in a region of memory that stores global variables and constants), data at the addresses within the offset range of the GP can be accessed with a single displacement memory access instruction (e.g., a single displacement load or store instruction). For example, where the offset is 16-bits, a single load or store instruction can be used to access a 64 KB range of addresses from the GP (e.g., the 64 KB address space defined by the 32 KB addresses above the GP address and the 32 KB addresses below the GP address). As described above, known ISAs implement GP relative addressing via generic load and store instructions where the GP register must be explicitly identified as the base register from the set of all possible registers. However, as described above, the range of addresses accessible from the GP is limited by the number of bits allocated to the offset in the generic load/store instructions.

Having displacement memory access instructions (e.g., load and store instructions) that implicitly identify the GP register as the base register allows the offset range for the displacement memory access instructions to be extended. This extends the range of addresses that can be accessed by such a displacement memory access instruction. For example, if a generic displacement memory access instruction uses sixteen bits to identify an offset and five bits to identify the base register, then the range of addresses that can be accessed from the GP is 64 KB ($2^{16}$) (e.g., 32 KB above the GP and 32 KB below the GP). If, however, an instruction implicitly identifies the GP register as the base register by the opcode, for example one or more of the five bits that were previously used to explicitly identify the base register can be used to extend the offset. This extends the range of addresses that can be directly accessed from the GP. For example, if all five bits are used to extend the offset to twenty-one bits, this may extend the range of addresses that can be directly accessed from the GP by $2^5$ to 2 MB ($2^{21}$) (e.g., 1 MB above the GP and 1 MB below the GP). This means that the region of memory that is accessible via a single GP-relative memory access instruction is exponentially larger.

Accordingly, where the code being executed is PIC code, this extends the number of GOT entries that can be accessed via a single GP relative memory access instruction; and where the code being executed is non-PIC code, this increases the number of data items in memory that will fall within the region accessible via a single GP relative memory access instruction. In the latter case, this reduces the number of data items in memory that will fall outside this region (and thus reduces the number of data items which require two or more instructions to access) which in turn may increase the efficiency and code density of the program.

The one or more displacement memory access instructions (e.g., store instructions and/or load instructions) that implicitly identify the GP register as the base register may include a plurality of displacement memory access instructions that cause different sized data to be loaded from, or stored to, the global memory. Specifically, in some cases, the one or more displacement memory access instructions that implicitly identify the GP register as the base register may comprise a first load instruction to load data of a first size (e.g., byte) from the global memory and a second load instruction to load data of a second size (e.g., word) from the global memory; and/or a first store instruction to store data of a first size (e.g., byte) to the global memory and a second store instruction to store data of a second size (e.g., word) to the global memory.

For example, the displacement memory access instructions (e.g., store instructions and/or load instructions) that implicitly identify the GP register as the base register may include one or more of the following:

LB (load byte) [GP]—which causes the execution unit to load a byte from an address in memory based on the GP register and a specified offset into a specified general-purpose destination register LBU (load byte unsigned) [GP]—which causes the execution unit to load a byte from an address in memory based on the GP address and specified offset into a specified general-purpose destination register as unsigned data LH (load half) [GP]—which causes the execution unit to load a half word (i.e., two bytes) from an address in memory based on the GP register and a specified offset into a specified general-purpose destination register LHU (load half unsigned) [GP]—which causes the execution unit to load a half word (i.e., two bytes) from an address in memory based on the GP register and a specified offset into a specified general-purpose destination register as unsigned data LW (load word) [GP]—which causes the execution unit to load a word from an address in memory based on the GP register and a specified offset into a specified general-purpose destination register LWU (load word unsigned) [GP]—which causes the execution unit to load a word from an address in memory based on the GP register and a specified offset into a specified general-purpose destination register as unsigned data LD (load double) [GP]—which causes the execution unit to load a double word (i.e., eight bytes) from an address in memory based on the GP register and a specified offset into a specified general-purpose destination register SB (store byte) [GP]—which causes the execution unit to store a byte from a specified general-purpose register to an address in memory based on the GP register and a specified offset SH (store half) [GP]—which causes the execution unit to store a half word (i.e., two bytes) from a specified general-purpose register to an address in memory based on the GP register and a specified offset SW (store word) [GP]—which causes the execution unit to store a word from a specified general-purpose register to an address in memory based on the GP register and a specified offset SD (store double) [GP]—which causes the execution unit to store a double word (i.e., eight bytes) from a specified general-purpose register to an address in memory based on the GP register and a specified offset Example 32-bit formats for these instructions are described below with reference to FIGS. 9 to 18 and 32. Programs typically use various sized data types (e.g., byte, half word (i.e., two bytes), word (i.e., four bytes), double word (i.e., eight bytes)) to store numbers. To minimize the amount of memory that is required by a program, the programmer typically uses the smallest data type that is able to cover a desired range of values. Having dedicated instructions that enable processing of data of different sizes allows such programs to be properly executed without having to use additional instructions to convert from one data size to another.

Where the one or more displacement memory access instructions (e.g., store instructions and/or load instructions) that implicitly identify the GP register as the base register include a plurality of displacement memory access instructions that cause different sized data to be loaded from, or stored to, the global memory, the instructions that relate to different sized data may have different sized offsets (e.g., a different number of offset bits). For example, as shown in FIGS. 9-14 the load byte and load half word instructions that implicitly identify the GP register as the base register may have 18 offset bits, whereas the load word instruction that implicitly identifies the GP register may have 21 offset bits. Similarly, as shown in FIGS. 15-18 the store byte and store half word instructions that implicitly identify the GP register as the base register may have 18 offset bits, whereas the store word instruction that implicitly identifies the GP register as the base register may have 21 offset bits. This allows the offset size (and thus the reachable range) to be adjusted based on how common different data sizes are. For example, where word data is significantly more common, it may warrant allocating a larger fraction of the opcode space to extend the reachable range.

The one or more displacement memory access instructions that implicitly identify the GP register as the base register may include a plurality of displacement memory access instructions that cause data to be loaded into, or stored from, different types of target registers. Specifically, in some cases, the one or more displacement memory access instructions that implicitly identify the GP register as the base register may comprise a first load instruction to load data from global memory into a first type of register (e.g., a general-purpose register) and a second load instruction to load data from global memory into a second type of target register (e.g., a floating point register); and/or a first store instruction to store data from a first type of register (e.g., general-purpose register) into global memory and a second store instruction to store data from a second type of register (e.g., floating point register) into global memory.

For example, in addition to the displacement memory access instructions (e.g., store instructions and/or load instructions) that implicitly identify the GP register as the base register comprising one or more of the instructions described above that load data into, or store data from, a general-purpose register, the displacement memory access instructions that implicitly identify the GP register as the base register may also include one or more of the following instructions that load data into, or store data from, a floating point register:

LWC1 (load word floating point) [GP]—which causes the execution unit to load a word from an address in memory based on the GP register and a specified offset into a specified floating point register SWC1 (store word floating point) [GP]—which causes the execution unit to store a word from a specified floating point register to an address in memory based on the GP register and a specified offset LDC1 (load double floating point) [GP]—which causes the execution unit to load a double word (i.e., eight bytes) from an address in memory based on the GP register and a specified offset into a specified floating point register SDC1 (store double floating point) [GP]—which causes the execution unit to store a double word (i.e., eight bytes) from a specified floating point register to an address in memory based on the GP address and a specified offset In some cases, the decode unit 504 may be configured to decode instructions of different lengths. For example, the decode unit 504 may be configured to decode instructions that are both 16-bits in length (16-bit instructions) and 32-bits in length (32-bit instructions). In these cases, the one or more displacement memory access instructions (e.g., store and/or load instructions) that implicitly identify the GP register as the base register may include a plurality of displacement memory access instructions wherein at least one of the displacement memory access instructions is of a first length (e.g., 32 bits) and at least one of the displacement memory access instructions (of the same type) is of a different length (e.g., 16 bits). For example, in addition to the instruction set comprising one or more 32-bit load instructions that implicitly identify the GP register as the base register, as described above and with reference to FIGS. 9 to 14, the instruction set may comprise one or more 16-bit load instructions that implicitly identify the GP register as the base register. An example format of a 16-bit load instruction that implicitly identifies the GP register as the base register is shown and described with reference to FIG. 23. Similarly, in addition to the instruction set comprising one or more 32-bit store instructions that implicitly identify the GP register as the base register, as described above and with reference to FIGS. 15 to 18, the instruction set may comprise one or more 16-bit store instructions that implicitly identify the GP register as the base register. An example format of a 16-bit store instruction that implicitly identifies the GP register as the base register is shown and described with reference to FIG. 24.

The shorter length memory access instruction (load/store) (e.g., 16-bit instruction) will take up less space in the code than the corresponding longer length memory access (load/store) instruction (e.g., 32-bit instruction), and thus the more often the shorter length memory access instruction (load/store) (e.g., 16-bit instruction) can be used in the code, the shorter the code will be. However, the shorter length memory access instruction (load/store) (e.g., 16-bit instruction) typically has a smaller offset range than its corresponding longer length memory access (load/store) instruction (e.g., 32-bit instruction) and thus can only be used to access a limited number of data variables or constants. Accordingly, further code density improvements may be achieved by, at build time, sorting the global variables and constants based on how often they are accessed and placing the most commonly accessed data items in the range that is accessible from the shorter length memory access instruction (e.g., 16-bit instruction). This allows the shorter length memory access instructions to be used more often thus reducing the size of the overall code for a program.

In addition, or alternatively, to comprising one or more displacement memory access instructions, the one or more instructions that implicitly identify the GP register as an operand of the instruction may comprise one or more register arithmetic instructions that implicitly identify the GP register as the source register of the instruction. Register arithmetic instructions cause an immediate to be added to, or subtracted from, a value in a register (the source register) and stored in another register. Register arithmetic instructions typically require that the source register be explicitly identified (e.g., by number) in the instruction.

Using register arithmetic instructions (e.g., register addition and/or subtraction instructions) that implicitly identify the GP register as the source register allows the addresses that can be calculated from the GP register to be expanded. For example, if a generic register arithmetic instruction (e.g., register addition or register subtraction instruction) uses sixteen bits to specify an immediate to be added to the value of a register and five bits to identify the source register, then the range of addresses that can be calculated via the immediate bits is the 64 KB ($2^{16}$) range of address from the addresses in the source register (e.g., GP register). If, however, the GP register is implicitly identified as the source register by the opcode, for example, then one or more of the five bits that were previously used to identify the source register can be used to extend the immediate. This extends the range of addresses that can be calculated via the immediate. For example, if all five bits are used to extend the offset to twenty-one bits, the range of addresses that can be calculated via the immediate is extended by a factor of $2^5$ to the 2 MB ($2^{21}$) range of addresses from the address in GP register.

The one or more register arithmetic instructions that implicitly identify the GP register as the source register may include a plurality of register arithmetic instructions that cause immediates of different measurement units to be added to the GP register value. Specifically, in some cases, the one or more register arithmetic instructions that implicitly identify GP register as the source register may comprise a first register arithmetic instruction which causes an immediate in a first measurement unit (e.g., bytes) to be added to the address of the GP register, and a second register arithmetic instruction which causes an immediate in a second measurement unit (e.g., words) to be added to the value of the GP register.

For example, the register arithmetic instructions that implicitly identify the GP register as the source register may include one or more of the following instructions:

ADDIU (add immediate unsigned) [GP.B]— which causes the sum of a specified unsigned immediate (in bytes) and the value of the GP register to be calculated and stored in a specified general-purpose register ADDIU (add immediate unsigned) [GP.W]— which causes the sum of a specified unsigned immediate (in words) and the value of the GP register to be calculated and stored in a specified general-purpose register Example 32-bit formats for these instructions are described below with reference to FIGS. 25 and 26.

As described above, in some cases the decode unit 504 may be configured to receive and decode instructions of different lengths. For example, the decode unit 504 may be configured to decode instructions that are 16-bits in length (16-bit instructions), 32-bits in length (32-bit instructions), or 48-bits in length (48-bit instructions). In these cases, the one or more register arithmetic instructions that implicitly identify the GP register as the source register may include a plurality of register arithmetic instructions wherein at least one of the register arithmetic instructions is of a first length (e.g., 32 bits) and at least one of the register arithmetic instructions is of a different length (e.g., 48 bits). For example, in addition to the instruction set comprising one or more 32-bit register arithmetic instructions that implicitly identify the GP register as the source register, as described above and with reference to FIGS. 25 and 26, the instruction set may also comprise one or more 48-bit register arithmetic instructions. An example format of a 48-bit register arithmetic instruction is shown and described with reference to FIG. 27. The example 48-bit arithmetic instruction causes a 32-bit immediate to be added to the GP register. This allows any address in a 32-bit address space to be generated from the GP register. Such an instruction provides a universal fall back if the global data section is so large that some of the data cannot be reached directly by the other GP relative instructions.

As described above, some ISAs have addressed the inefficiency of the displacement addressing mode through the use of PC-relative addressing by using the PC as the base address. However, the number of data items that can be accessed via an offset from the PC is quite limited since most data items are in a section of memory that is remote from where the code/text is situated. Accordingly, using the GP address as the base address provides more flexibility and typically provides (particularly for non-PIC code) direct access to more data items through a single displacement memory access instruction. That said, there may be certain situations where it may be efficient to calculate an address from the program counter. In some cases, the instruction set may also comprise one or more instructions that implicitly identify the program counter as an operand of the instruction.

In these cases, the decode unit 504 of FIG. 5 may be further configured to, in response to receiving an instruction that implicitly identifies the program counter as an operand, output one or more control signals to cause the execution unit 506 to perform the identified operation with the program counter as an operand of the instruction.

Like identifying instructions that implicitly identify the GP register as an operand of the instruction, the decode unit 504 may be configured to identify instructions that implicitly identify the program counter as an operand of the instruction based on the bit pattern of the received instruction. For example, each instruction that implicitly identifies the program counter as an operand of the instruction may have a unique recognizable bit pattern (e.g., certain bits of the instruction, which may or may not be contiguous bits, may have a recognizable pattern) that identifies the instruction as an instruction that implicitly identifies the program counter as an operand of the instruction. For example, in some cases each instruction that implicitly identifies the program counter as an operand of the instruction may have a unique opcode. Program counter related instructions are intended to supplement the GP-relative instructions. These instructions can be used for generating PC-relative addresses for the GP register. In addition, these instructions can also be used for the original purpose of code-density increase in and of themselves.

The one or more instructions that implicitly identify the program counter as an operand of the instruction may include one or more register arithmetic instructions which implicitly identify the program counter as the source register, and/or one or more displacement memory access instructions which implicitly identify the program counter as the base register. The one or more instructions that implicitly identify the program counter as the source register may comprise instructions of different lengths.

Figure 28:
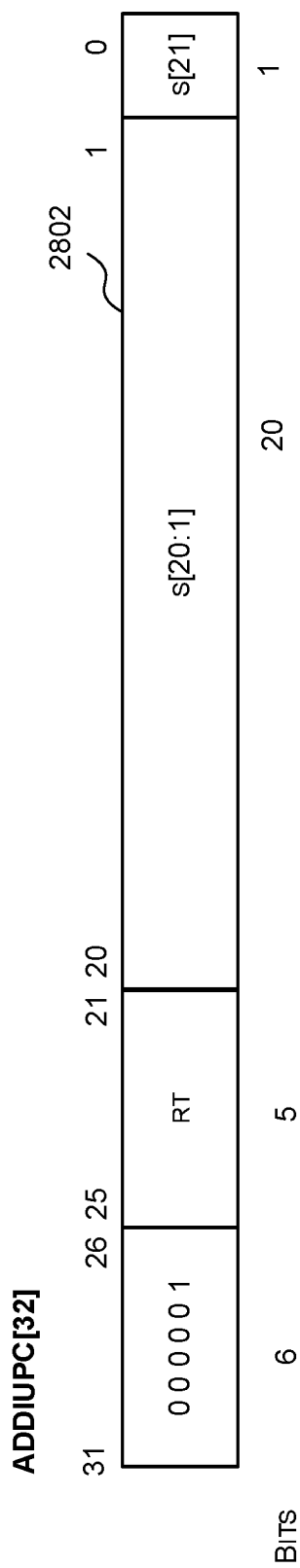
FIG. 28 is a schematic diagram of an example 32-bit format of an add immediate program counter instruction that implicitly identifies the program counter as the source register.
Figure 29:
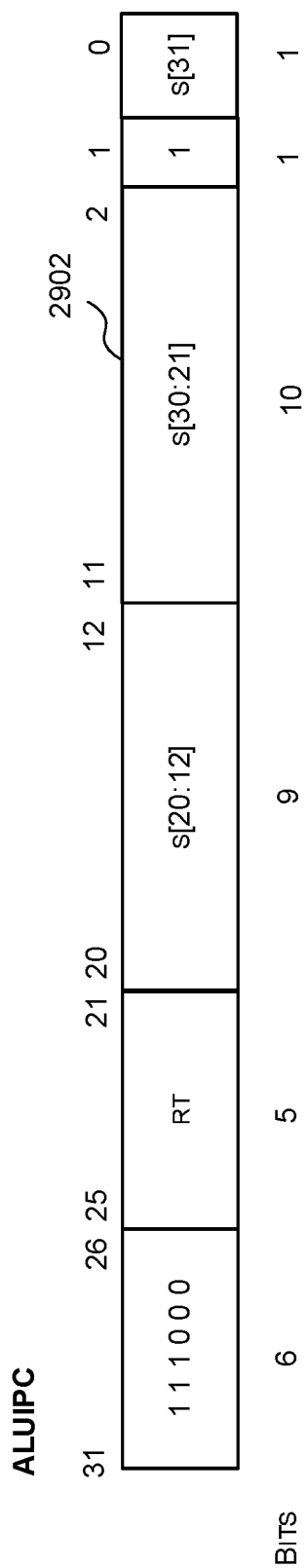
FIG. 29 is a schematic diagram of an example 32-bit format of a compute aligned program counter instruction that implicitly identifies the program counter as the source register.

For example, the one or more instructions that implicitly identify the program counter as an operand of the instruction may include one or more of the following:

ADDIUPC (add immediate unsigned program counter)—adds an immediate to the next program counter and stores the result in a specified general-purpose register ALUIPC (add program counter)—computes an aligned address as the upper 20-bit immediate offset from the next program counter and stores the result in a specified general-purpose register LWPC (load word program counter)—loads a word from memory at an address based on the program counter and a specified offset into a specified general-purpose register SWPC (store word program counter)—stores a word from a specified general-purpose register to memory at an address based on the program counter and a specified offset Example 32-bit formats for the ADDIUPC and ALUIPC instructions are described with reference to FIGS. 28 and 29. Example 48-bit formats for the LWPC and SWPC instructions are described with reference to FIGS. 30 and 31.

As described above, PIC functions that access global data typically start by calculating the address of the GOT given the current program counter value. The ALUIPC instruction provides a highly efficient way to calculate the address of the GOT for any function using a single instruction. This is because this instruction can create a 4 KB aligned pointer anywhere in a 32-bit address space in a PIC code model.

The execution unit 506 is configured to execute the decoded instructions (i.e., perform the operations identified using the implicitly or explicitly identified operand(s)) received from the decode unit 504. In some cases, the execution unit 506 may comprise one or more arithmetic logic units (ALUs). The execution unit 506 may have one or more sub-units dedicated to performing certain functions where the instruction set comprises both an instruction that explicitly identifies a register as an operand and a corresponding GP-relative instruction that implicitly identifies the GP register as an operand. The two instructions may be executed by the same sub-units because the operation performed by the two instructions is the same.

For example, the execution unit 504 may comprise a sub-unit for executing displacement store instructions and/or a sub-unit for executing displacement load instructions. The dedicated unit for executing displacement store instructions may be configured to write the data in a general-purpose register to an address in memory generated from the data in a base register plus an offset. Similarly, the dedicated sub-unit for executing a displacement load instruction may be configured to load the data from an address in memory generated from the data in a base register plus an offset into a general-purpose register. Where the instruction set comprises one or more displacement load instructions which require explicit identification of the base register (e.g., the LW [generic] of FIG. 13) and one or more displacement load instructions that implicitly identify the GP register as the base register (e.g., the LW [GP] instruction of FIG. 13), both instructions may be executed by the same sub-unit because both instructions cause the execution unit to perform the same operation with the same type of operands. Similarly, where the instruction set comprises one or more displacement store instructions which require explicit identification of the base register (e.g., the SW [generic] of FIG. 17) and one or more displacement store instructions that implicitly identify the GP register as the base register (e.g., the SW [GP] instruction of FIG. 17), both instructions may be executed by the same sub-unit because both instructions cause the execution unit to perform the same instruction with the same type of operands.

Figure 8:
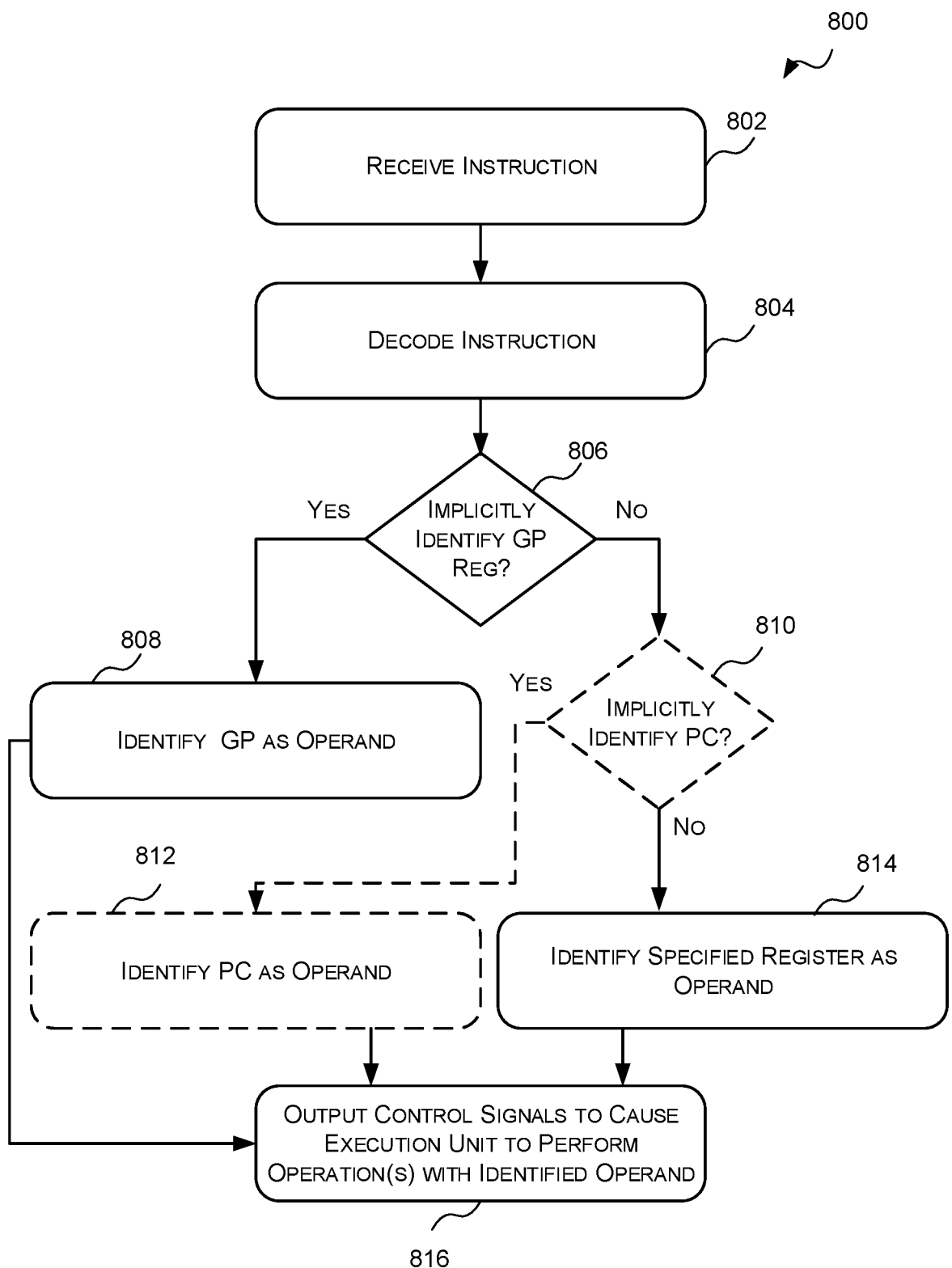
FIG. 8 is a flow diagram of an example method of decoding instructions.

Reference is now made to FIG. 8 which illustrates an example method 800 of decoding instructions at a data processing apparatus, such as the data processing apparatus 500 of FIG. 5, that implements an ISA that includes an instruction set with one or more instructions that implicitly identify the GP register as an operand of the instruction. The method 800 begins at block 802 where the decode unit receives an instruction for execution. At block 804, the decode unit 504 decodes the received instruction. As described above, decoding the instruction may comprise identifying the operation to be performed by the instruction and identifying the operands thereof. The decode unit may be configured to decode the received instruction by identifying a predetermined pattern of bits in the instruction from a plurality of predetermined patterns. For example, each different instruction may be identified by a unique pattern of bits in the instruction. Once the instruction has been decoded the method 800 proceeds to block 806.

At block 806 the decode unit 504 determines whether the decoded instruction is an instruction that implicitly identifies the GP register as an operand of the instruction. If the decode unit 504 determines that the decoded instruction is an instruction that implicitly identifies the GP register as an operand of the instruction, then the method proceeds to block 808 where the decode unit identifies the GP register as an operand of the instruction and then the method 800 proceeds to block 816. If, however, the decode unit 504 determines that the decoded instruction is not an instruction that implicitly identifies the GP register as an operand, then the method 800 may proceed to block 810 (if the instruction set comprises one or more instructions that implicitly identify the program counter as an operand of the instruction) or the method 800 may proceed directly to block 814 or the method 800 may end.

At block 810, the decode unit determines whether the decoded instruction is an instruction that implicitly identifies the program counter as an operand of the instruction. If the decode unit 504 determines the decoded instruction is an instruction that implicitly identifies the program counter as an operand, then the method 800 proceeds to block 812 where the decode unit 504 identifies the program counter as an operand of the instruction and the method 800 proceeds to block 816. If, however, the decode unit 504 determines that the decoded instruction is not an instruction that implicitly identifies the program counter as an operand of the instruction, then the method 800 proceeds to block 814 where the decode unit 504 may identify an explicitly specified register as an operand and the method 800 proceeds to block 816.

At block 816, the decode unit outputs one or more control signals to cause the execution unit to perform the operation identified by the instruction with the operand(s) identified in block 808, 812 or 814.

Processor architectures have been routinely categorized by describing either the underlying hardware architecture or microarchitecture of a given processor, or by referencing the instruction set executed by the processor. The latter, the ISA, describes the types and ranges of instructions available, rather than describing how the instructions are implemented in hardware. The result is that for a given ISA, the ISA can be implemented using a wide range of techniques, where the techniques can be chosen based on preference or need for execution speed, data throughput, power dissipation, and manufacturing cost, among many other criteria. The ISA serves as an interface between code that is to be executed on the processor and the hardware that implements the processor. ISAs, and the processors or computers based on them, are partitioned broadly into categories including complex instruction set computers (CISC) and reduced instruction set computers (RISCs). The ISAs define types of data that can be processed; the state or states of the processor, where the state or states include the main memory and a variety of registers; and the semantics of the ISA. The semantics of the ISA typically include modes of memory addressing and memory consistency. In addition, the ISA defines the instruction set for the processor, whether there are many instructions (complex) or fewer instructions (reduced), and the model for control signals and data that are input and output. RISC architectures have many advantages to processor design because by reducing the numbers and variations of instructions, the hardware that implements the instructions can be simplified. Further, compilers, assemblers, linkers, etc., that convert the code to instructions executable by the architecture can be simplified and tuned for performance.

In order for a processor to process data, the data must be made available to the processor or process. As discussed throughout, pointers can be used to share data between and among processors, processes, etc., by providing a reference address or pointer to the data. The pointer can be provided in lieu of transferring the data to each processor or process that requires the data. The pointers that are used for passing data references can be local pointers known only to a given, local processor or process, or can be GPs. The GPs can be shared among multiple processors or processes. The GPs can be organized or grouped into a GP register. The registers can include general-purpose registers, floating point registers, and so on. While operating systems such as Linux™ can use a GP for PIC, the use of the GP implies that a particular register is explicitly used to support PIC handling and execution. In contrast, the presently described RISC architecture uses instructions which implicitly reference a GP source. The GP source provides operands manipulated by the instructions. Use of instructions that implicitly use GP source operands allows bits within the instructions to be used for purposes other than explicitly referencing GP registers. The result of implicit GP source operands is that the instructions can free the bits previously used to declare the GP, and can therefore provide longer address offsets, extended register ranges, and so on.

A further capability of the presently described architecture includes support of the rotate and exchange or ROTX instruction. This instruction can support a variety of data operations such as bit reversal, bit swap, byte reversal, byte swap, shifting, striping, and so on, all within one instruction. The use of the ROTX instruction provides a computationally inexpensive technique for implementing multiple instructions within one instruction. The rotate and exchange instruction can overlay a barrel shifter or other shifter commonly available in the presently described architecture. Separately implementing these various rotate, exchange, or shift instructions would increase central processing unit (CPU) complexity because each instruction would have an impact on one or more aspects of the CPU design. By merging the various instructions into the ROTX instruction, CPU hardware that implemented the separate instructions can be combined to result in a less complex processor.

Processors commonly include a "mode" designator to indicate that the mode in which a processor is operating is based on a number of bytes, words, and so on. For some processor architecture techniques, a mode can include a 16-bit operation, a 32-bit operation, a 64-bit operation, and so on. One or more bits within an instruction can be used to indicate the mode in which a particular instruction is to be executed. In contrast, if the processor is designed to operate without mode bits within each instruction, then the mode bits within each instruction can be repurposed. The repurposed bits within the instruction can be used to implement the longer address offsets or extended register ranges described elsewhere. When an operation "mode" is still needed for a particular operation, then instructions that are code-density oriented can be added. Specific instructions can be implemented for 16-bit, 32-bit, 64-bit, etc., operations when needed, rather than implementing every instruction to include bits to define a mode, whether the mode is relevant to the instruction or not.

Storage used by processors can be organized and addressed using a variety of techniques. Typically, the storage or memory is organized as groups of bytes, words, or some other convenient size. To make storage or memory access more efficient, the access acquires as much data as reasonable with each access, thus reducing the numbers of accesses. Access to the memory is often most efficient in terms of computation or data transfer when the access is oriented or "aligned" to boundaries such as word boundaries. However, data to be processed does not always conveniently align to boundaries. For example, the operations to be performed by a processor may be byte oriented, the amount of data in memory may align to a byte boundary but not a word boundary, and so on. Accessing specific content such as a byte can, under certain conditions and depending on the implementation of the processor, require multiple read operations. To improve computational efficiency, unaligned memory access can be required. The unaligned memory access may be needed for computational if not access efficiency. A given ISA can support explicit unaligned storage or memory accesses. The general forms of the load and store instructions for the ISA can include unaligned load instructions and unaligned store instructions. The unaligned load instructions and the unaligned store instructions support a balance or tradeoff between increased density of the code that is executed by a processor and reduced processor complexity. The unaligned load instructions and the unaligned store instructions can be implemented in addition to the standard load instructions and store instructions, where the latter instructions align to boundaries such as word boundaries. When an unaligned load or store is performed, the "extra" data, such as bytes that can be accessed, can be held temporally for potential use by a subsequent read or store instruction (e.g., data locality).

For various reasons, execution of code can be stopped at a point in time and restarted at a later point in time, after a duration of time, and so on. The stopping and restarting of code execution can result from an exception occurring, receiving a control signal such as a fire signal or done signal, detection of an interrupt signal, and so on. In order to efficiently handle save and restore operations, an ISA can include instructions and hardware specifically tuned for save and store operations. A save instruction can save registers, where the registers can be stored in a stack. The saved registers can include source registers. A stack pointer can be adjusted to account for the stored registers. The saving can also include storing a local stack frame, where a stack frame can include a collection of data (or registers) on a stack that is associated with an instruction, a subprogram call, a function call, etc., that caused the save operation. The restore operation can reverse the save technique. The registers that were saved by the save operation can be restored. The restored registers can include destination registers. When the registers have been restored, the restore operation can cause a jump to a return address. Code execution can continue beginning with the return address.

Reference is now made to FIGS. 9 to 27 and 32 which illustrate examples formats of instructions that implicitly identify the GP register as an operand of the instruction and FIGS. 28 to 31 which illustrate example formats of instructions that implicitly identify the program counter as an operand of the instruction. The instruction set may comprise any combination of these instructions. In these examples, binary values in these figures represent specific bit patterns which must be included in the instruction in order to be decoded by the decode unit 504 as an instance of the instruction. The remaining fields are named instruction operands. Also, fields with names ending in square parentheses such as 's[7:0]' and 's[0]' specify a particular range of bits for the named operand, using a Verilog style syntax. A single operand value may be split into more than one field in the instruction encoding, with the bit ranges specified by each field explicitly in this way. All non-specified bits will be set to zero (e.g., if s[32] is not specified, then bit 32 will be set to zero). If no explicit bit range is specified, then the operand represents the least significant bits of the value.

Figure 9:
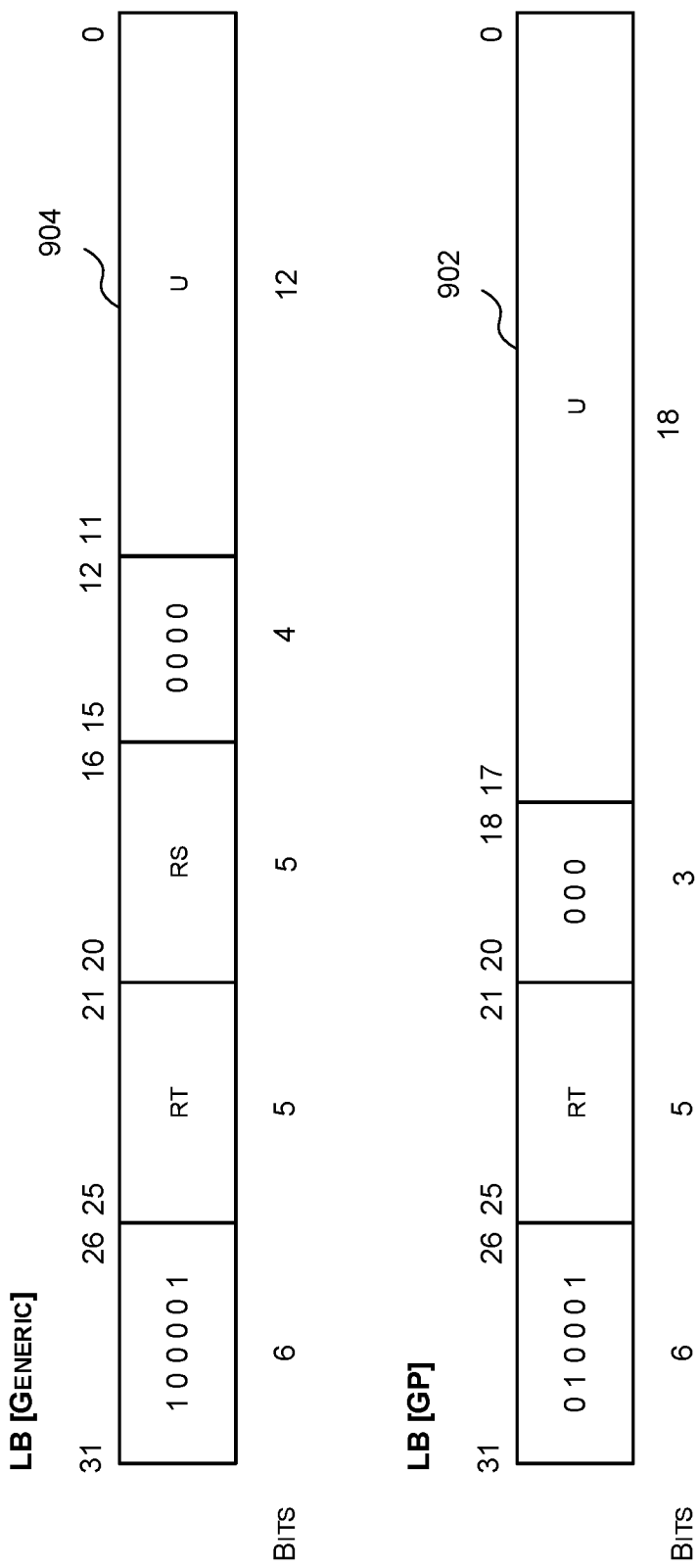
FIG. 9 is a schematic diagram of an example 32-bit format of a load byte instruction that implicitly identifies the GP register as the base register.

FIG. 9 illustrates an example 32-bit format of a load byte instruction (LB [GP]) 902 that implicitly identifies the GP register as the base register. This instruction causes a byte of data at the memory address (GP register+offset (u)) to be loaded into a specified general-purpose register (rt). It can be seen that in this example nine bits (bits 18-20 and bits 26-31) are used to identify the instruction as a LB [GP] instruction which leaves five bits (bits 21-25) to explicitly identify the general-purpose register (rt) and 18 bits (bits 0-17) for the offset (u). This allows an address range of $2^{18}$ addresses from the GP to be directly accessed via this instruction. For comparison, a generic load byte instruction (LB [Generic]) 904 that requires explicit identification of the base register (rs) has only a 12-bit offset (u) since ten bits (bits 12-15 and 26-31) are used to identify the instruction as a LB [Generic] instruction and five bits (bits 16-20) are used to explicitly identify the base register (rs). Accordingly, the LB [GP] instruction increases the address range that can be accessed with this instruction by a factor of $2^6$.

Figure 10:
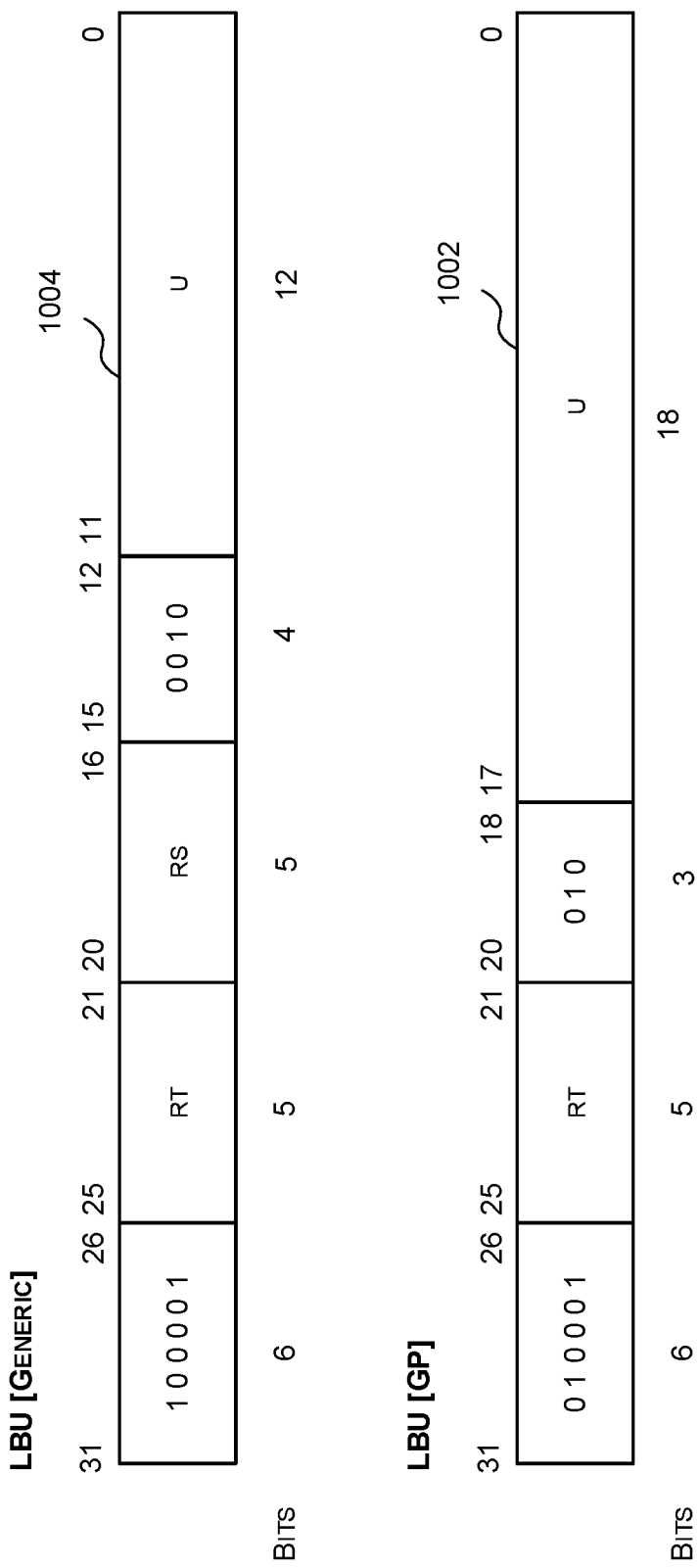
FIG. 10 is a schematic diagram of an example 32-bit format of a load byte unsigned instruction that implicitly identifies the GP register as the base register.

FIG. 10 illustrates an example 32-bit format of a load byte unsigned instruction (LBU [GP]) 1002 that implicitly identifies the GP register as the base register. This instruction causes a byte of data at memory address (GP register+offset (u)) to be loaded into a specified general-purpose register (rt) as unsigned data. It can be seen in this example that nine bits (bits 18-20 and 26-31) are used to identify the instruction as an LBU[GP] instruction which leaves five bits (bits 21-25) to explicitly identify the general-purpose register (rt) and 18 bits (bits 0 to 17) for the offset (u). This allows a range of $2^{18}$ addresses from the GP to be directly accessed via this instruction. For comparison, a generic load byte unsigned instruction (LBU [Generic]) 1004 that requires explicit identification of the base register (rs) has only a 12-bit offset (u) since ten bits (bits 12-15 and 26-31) are used to identify the instruction as an LBU [Generic] instruction and five bits (bits 16-20) are used to explicitly identify the base register (rs). Accordingly, the LBU [GP] instruction increases the address range that can be accessed with this instruction by a factor of $2^6$.

Figure 11:
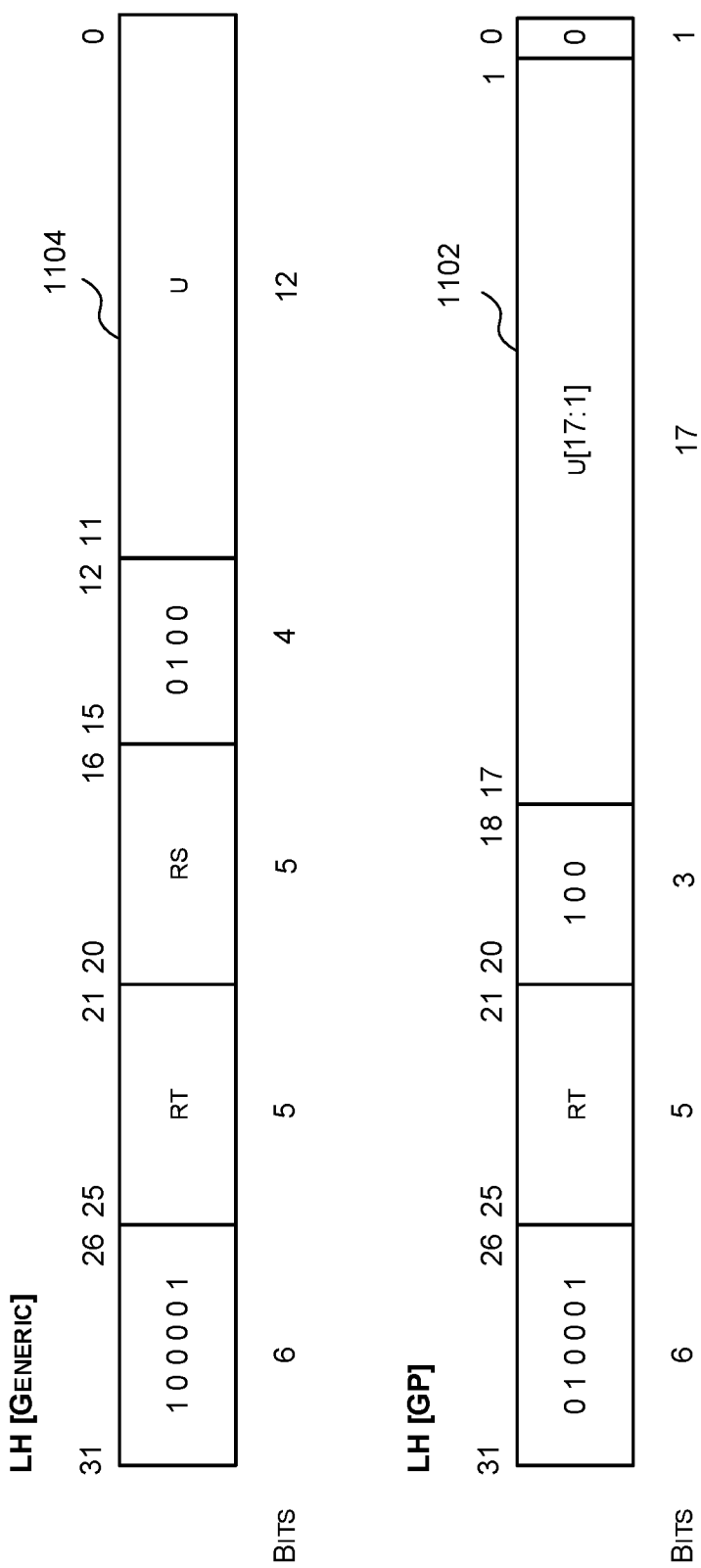
FIG. 11 is a schematic diagram of an example 32-bit format of a load half word instruction that implicitly identifies the GP register as the base register.

FIG. 11 illustrates an example 32-bit format of a load half instruction (LH [GP]) 1102 that implicitly identifies the GP register as the base register. This instruction causes a half word of data (i.e., two bytes of data) at memory address (GP register+offset (u)) to be loaded into a specified general-purpose register (rt). It can be seen that in this example, ten bits (bits 0, 18-20 and 26-31) are used to identify the instruction as a LH [GP] instruction which leaves five bits (bits 21-25) to explicitly identify the general-purpose register (rt) and 18 bits for an offset (17 bits which are explicitly specified+bit 0 which must be 0 for the address to be half word aligned). This allows a range of $2^{18}$ addresses from the GP to be directly accessed via this instruction. For comparison, a generic load half instruction (LH [Generic]) 1104 that requires explicit identification of the base register (rs) has only a 12-bit offset (u) since 10 bits (bits 12-15 and 26-31) are used to identify the instruction as a LH [Generic] instruction and 5 bits (bits 16-20) are used to explicitly identify the base register (rs). Accordingly, the LH [GP] instruction increases the address range that can be accessed with this instruction by a factor of $2^6$.

Figure 12:
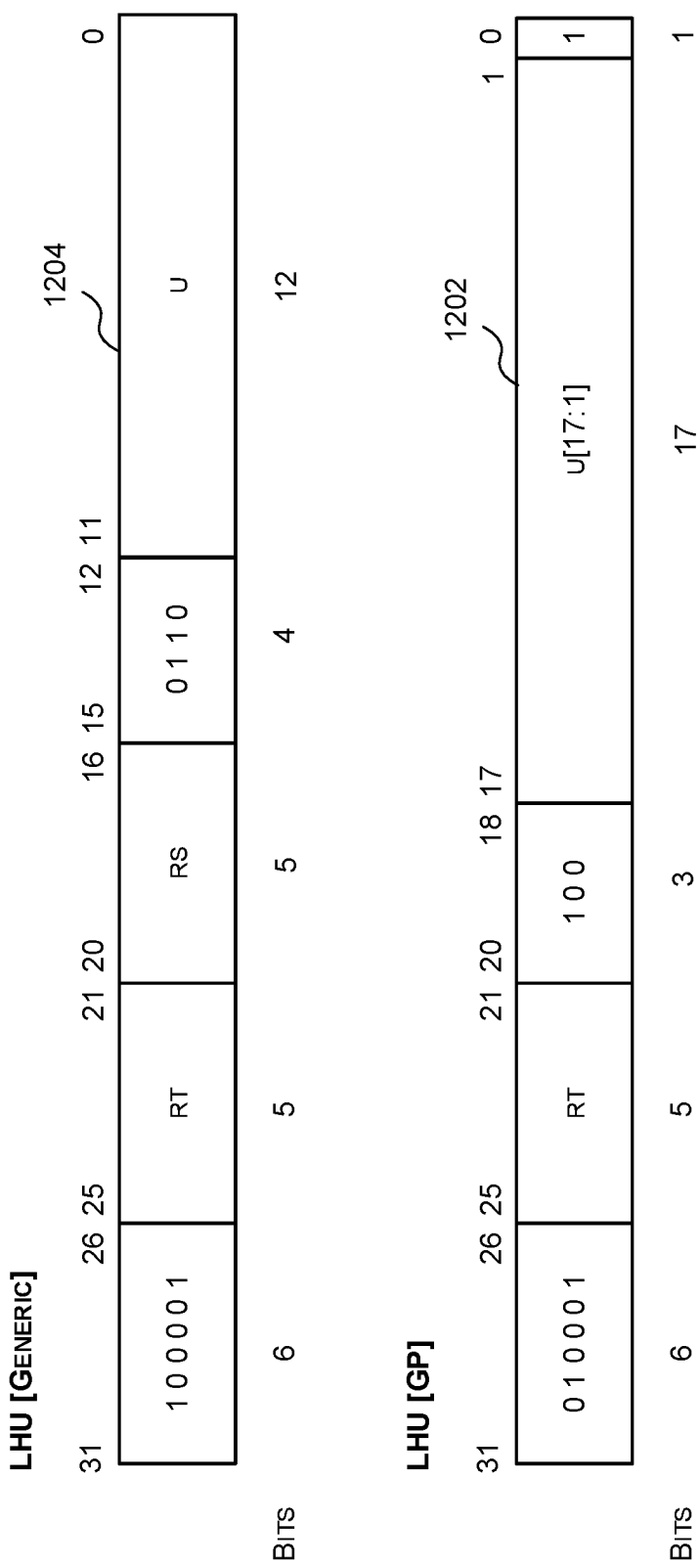
FIG. 12 is a schematic diagram of an example 32-bit format of a load half word unsigned instruction that implicitly identifies the GP register as the base register.

FIG. 12 illustrates an example 32-bit format of a load half unsigned instruction (LHU [GP]) 1202 that implicitly identifies the GP register as the base register. This instruction causes a half word of data (i.e., two bytes of data) at memory address (GP register+offset (u)) to be loaded into a specified general-purpose register (rt) as unsigned data. It can be seen that in this example, ten bits (bits 0, 18-20 and 26-31) are used to identify the instruction as an LHU [GP] instruction which leaves five bits (bits 21-25) to explicitly identify the general-purpose register (rt) and 18 bits for the offset (17 bits which are explicitly specified+bit 0 which must be 0 to be half word aligned). This allows a range of $2^{18}$ addresses from the GP to be directly accessed via this instruction. For comparison, a generic load half unsigned instruction (LHU [Generic]) 1204 that requires explicit identification of the base register (rs) has only a 12-bit offset (u) since ten bits (bits 12-15 and 26-31) are used to identify the instruction as an LHU [Generic] instruction and five bits (bits 16-20) are used to explicitly identify the base register (rs). Accordingly, the LHU [GP] instruction increases the address range that can be accessed with this instruction by a factor of $2^6$.

Figure 13:
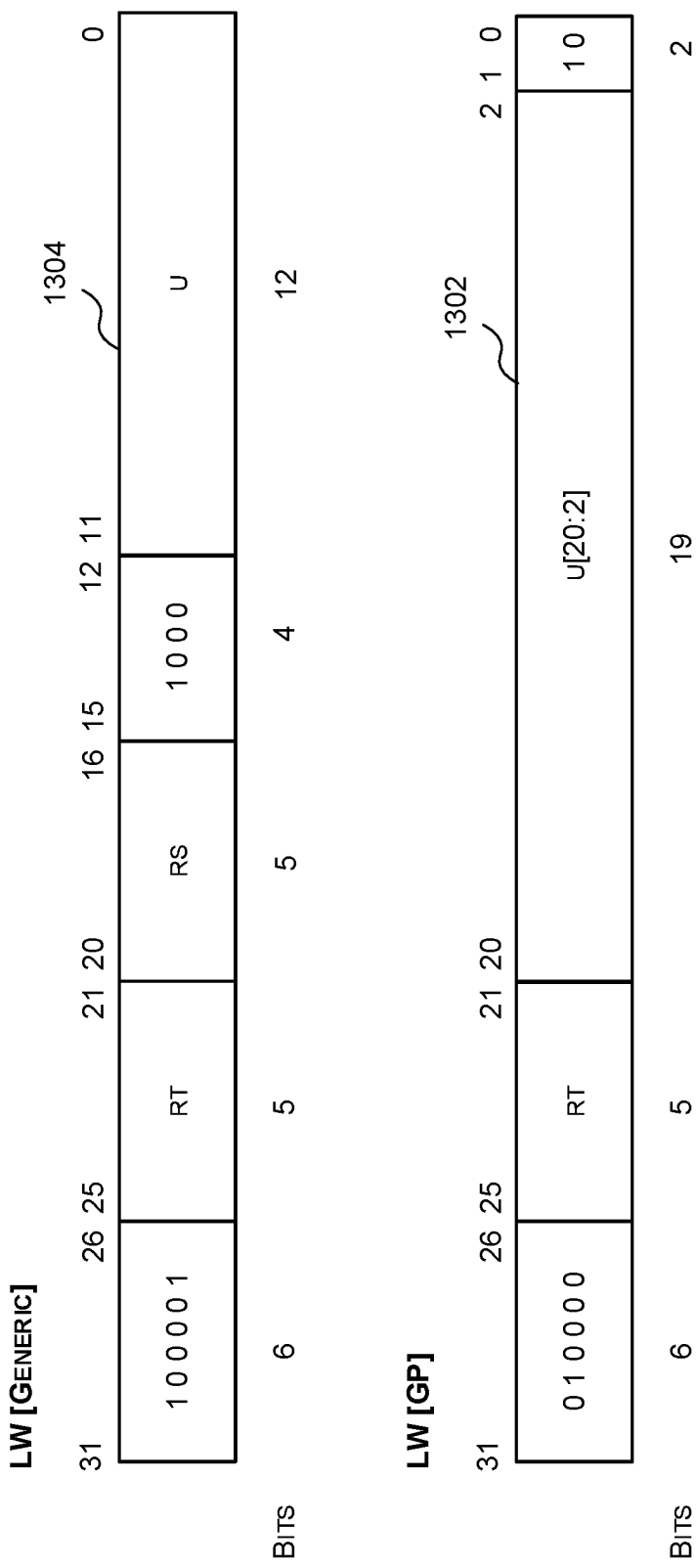
FIG. 13 is a schematic diagram of an example 32-bit format of a load word instruction that implicitly identifies the GP register as the base register.

FIG. 13 illustrates an example 32-bit format of a load word instruction (LW [GP]) 1302 that implicitly identifies the GP register as the base register. This instruction causes a word of data (i.e., four bytes of data) at memory address (GP register+offset (u)) to be loaded into a specified general-purpose register (rt). It can be seen that in this example only eight bits (bits 0-1, and 26-31) are used to identify the instruction as a LW [GP] instruction which leaves five bits (bits 21-25) to explicitly identify the general-purpose register (rt) and 21 bits for the offset (u) (19 specified bits plus the last two bits which must be zero to be word aligned). This allows an address range of $2^{21}$ addresses from the GP to be directly accessed via this instruction. For comparison, a generic load word instruction (LW [Generic]) 1304 that requires explicit identification of the base register (rs) has only a 12-bit offset (u) since ten bits (bits 12-15 and 26-31) are used to identify the instruction as a LW [Generic] instruction and five bits (bits 16-20) are used to explicitly identify the base register (rs). Accordingly, the LW [GP] instruction increases the address range that can be accessed with this instruction by a factor of $2^9$.

Figure 32:
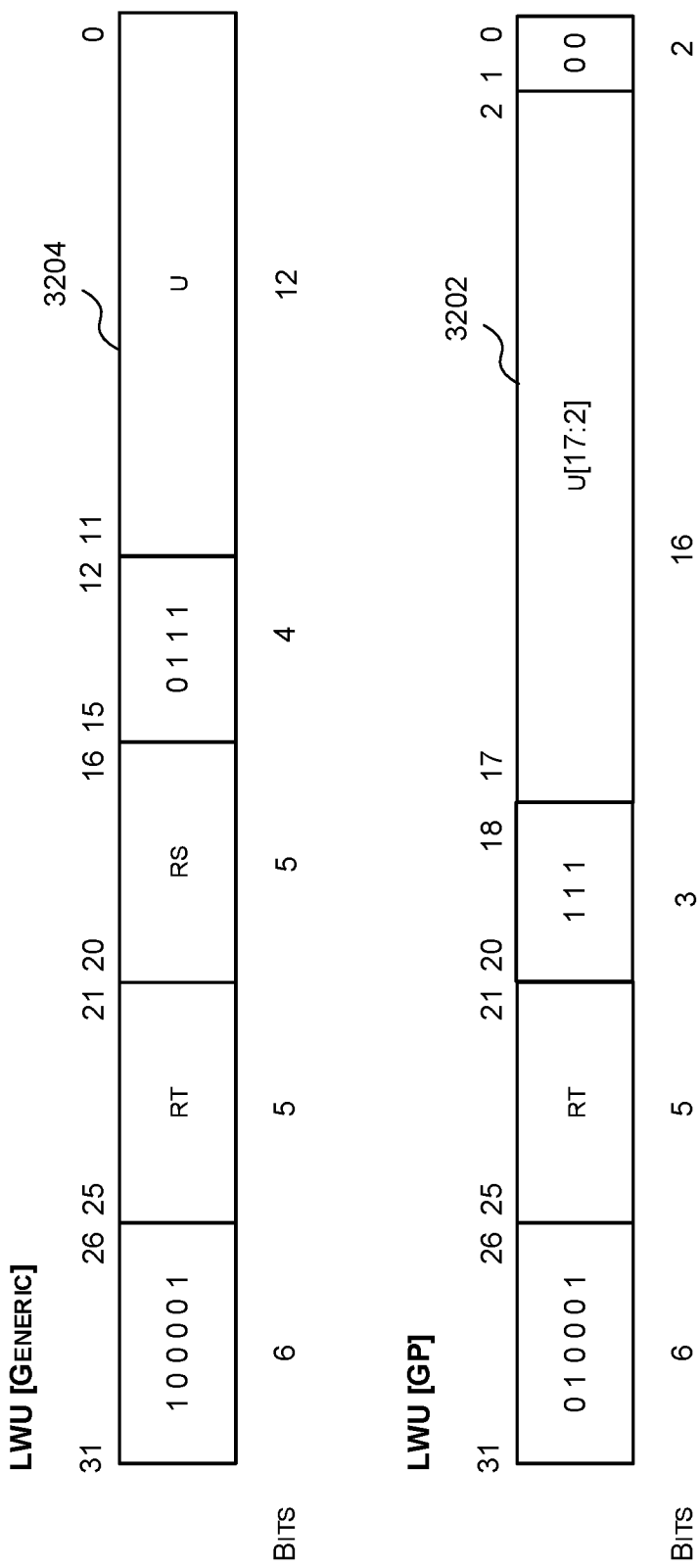
FIG. 32 is a schematic diagram of an example 32-bit format of a load word unsigned instruction that implicitly identifies the GP register as the base register.

FIG. 32 illustrates an example 32-bit format of a load word unsigned instruction (LWU [GP]) 3202 that implicitly identifies the GP register as the base register. This instruction causes a word of data (i.e., four bytes of data) at memory address (GP register+offset (u)) to be loaded into a specified general-purpose register (rt) as unsigned data. It can be seen that in this example only 11 bits (bits 0-1, 18-20, and 26-31) are used to identify the instruction as an LWU [GP] instruction which leaves five (bits 21-25) to explicitly identify the general-purpose register (rt) and 18 bits for the offset (u) (16 specified bits plus the last two bits which are set to zero to be word aligned). This allows an address range of $2^{18}$ addresses from the GP to be directly accessed via this instruction. For comparison, a generic load word unsigned instruction (LWU [Generic]) 3204 that requires explicit identification of the base register (rs) has only a 12-bit offset (u) since ten bits (bits 12-15 and 26-31) are used to identify the instruction as an LWU [Generic] instruction and five bits (bits 16-20) are used to explicitly identify the base register (rs). Accordingly, the LWU [GP] instruction increases the address range that can be accessed with this instruction by a factor of $2^6$.

Figure 14:
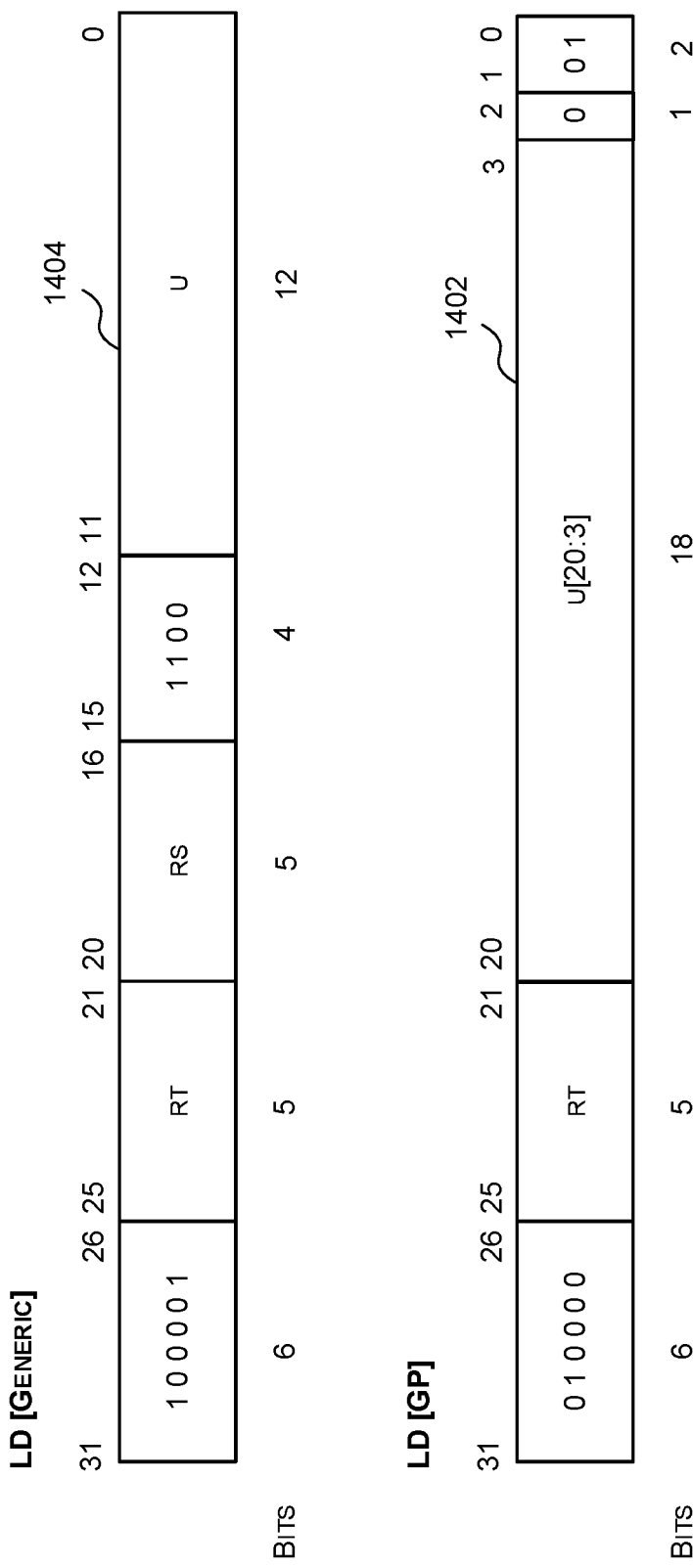
FIG. 14 is a schematic diagram of an example 32-bit format of a load double instruction that implicitly identifies the GP register as the base register.

FIG. 14 illustrates an example 32-bit format of a load double instruction (LD [GP]) 1402 that implicitly identifies the GP register as the base register. This instruction causes a double word of data (i.e., eight bytes of data) at memory address (GP register+offset (u)) to be loaded into a specified general-purpose register (rt). It can be seen that in this example only nine bits (bits 0-2, and 26-31) are used to identify the instruction as a LD [GP] instruction which leaves five bits (bits 25-21) to explicitly identify the general-purpose register (rt) and 21 bits for the offset (u) (18 specified bits plus the last three bits which must be zero to be double word aligned). This allows an address range of $2^{21}$ addresses from the GP to be directly accessed via this instruction. For comparison, a generic load double instruction (LD [Generic]) 1404 that requires explicit identification of the base register (rs) has only a 12-bit offset (u) since 10 bits (bits 12-15 and 26-31) are used to identify the instruction as a LD [Generic] instruction and 5 bits (bits 16-20) are used to explicitly identify the base register (rs). Accordingly, the LD [GP] instruction increases the address range that can be accessed with this instruction by a factor of $2^9$.

Figure 15:
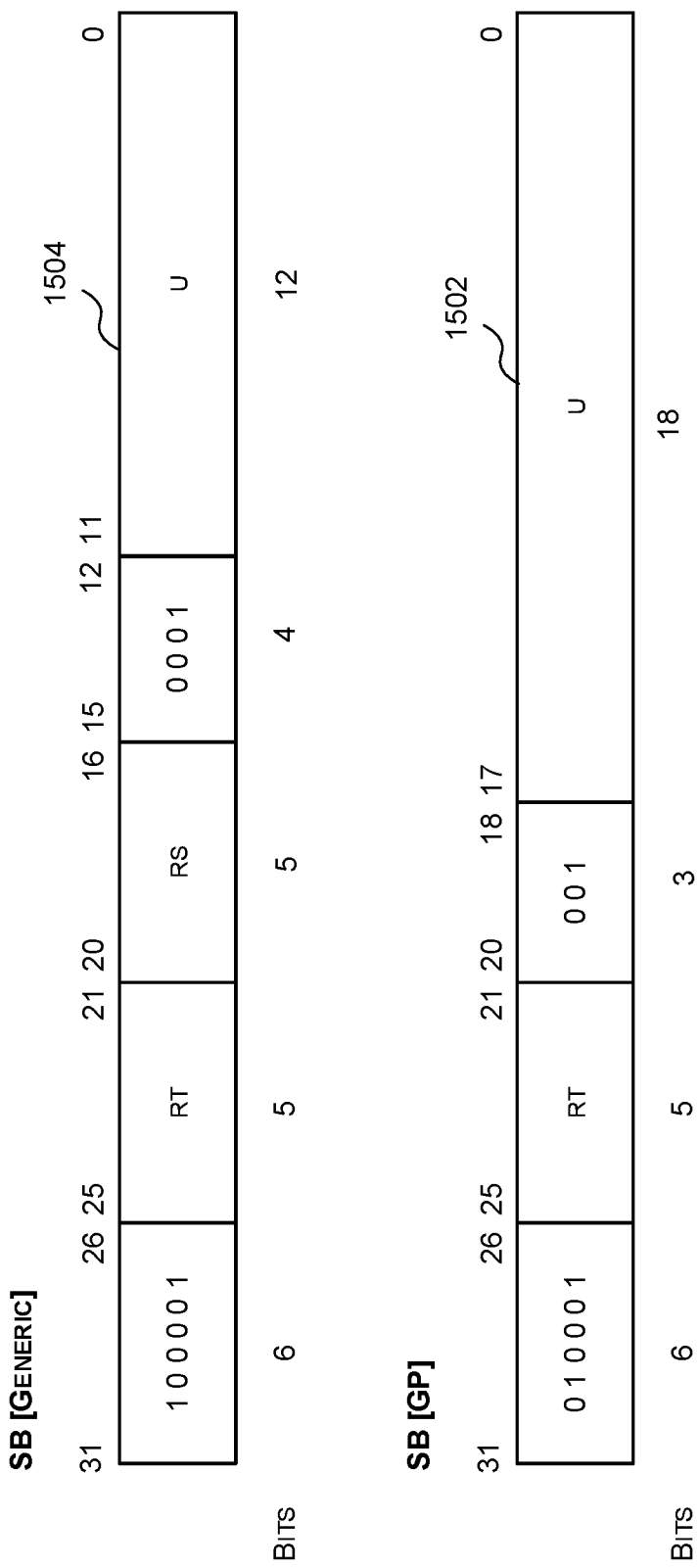
FIG. 15 is a schematic diagram of an example 32-bit format of a store byte instruction that implicitly identifies the GP register as the base register.

FIG. 15 illustrates an example 32-bit format of a store byte instruction (SB [GP]) 1502 that implicitly identifies the GP register as the base register. This instruction causes the byte of data in a specified general-purpose register (rt) to be stored at the memory address (GP register+offset (u)). It can be seen that in this example nine bits (bits 18-20 and 26-31) are used to identify the instruction as a SB [GP] instruction which leaves five bits to explicitly identify the general-purpose register (rt) and 18 bits for the offset (u). This allows an address range of $2^{18}$ addresses from the GP to be directly accessed via this instruction. For comparison, a generic store byte instruction (SB [Generic]) 1504 that requires explicit identification of the base register (rs) has only a 12-bit offset (u) since ten bits (bit 12-15 and 26-31) are used to identify the instruction as a SB [Generic] instruction and five bits (bits 16-20) are used to explicitly identify the base register (rs). Accordingly, the SB [GP] instruction increases the address range that can be accessed with this instruction by a factor of $2^6$.

Figure 16:
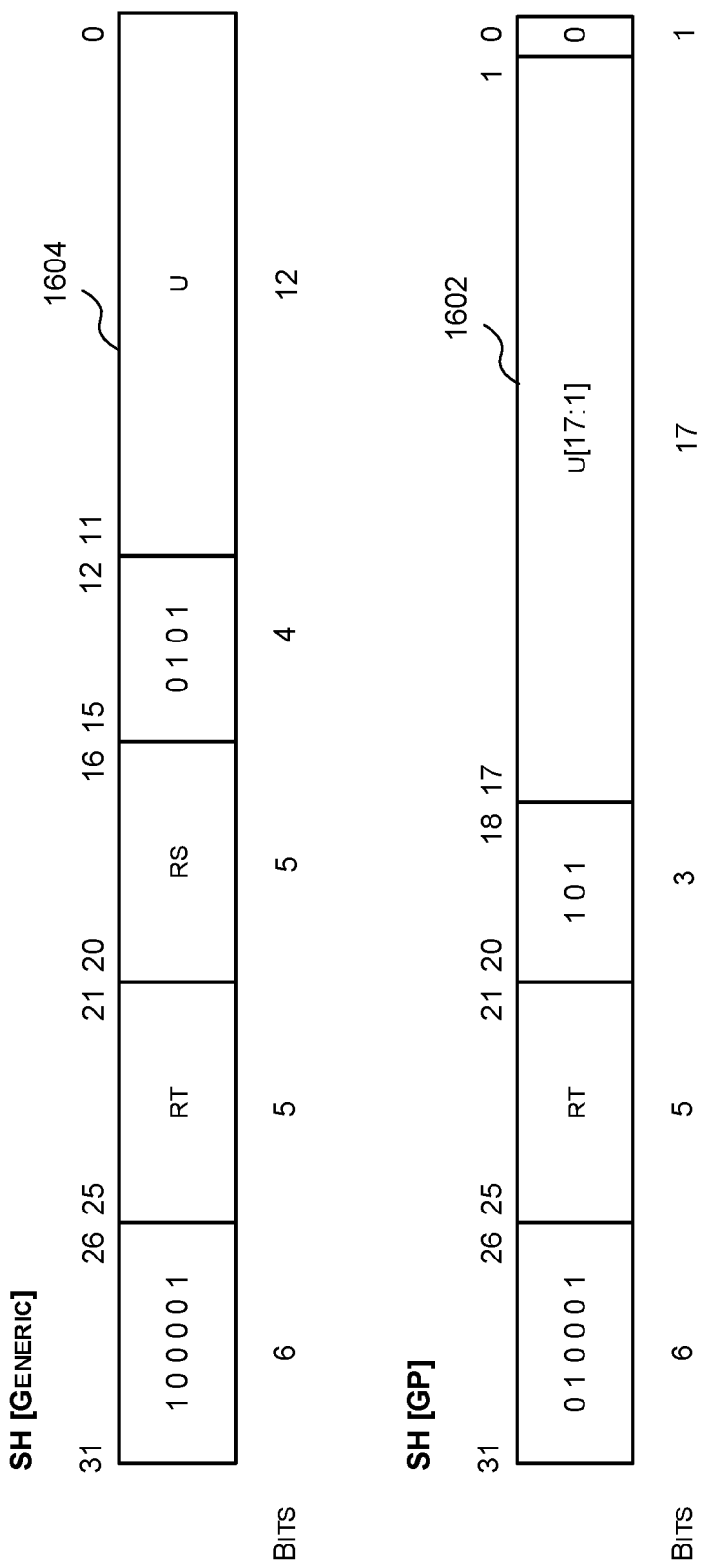
FIG. 16 is a schematic diagram of an example 32-bit format of a store half word instruction that implicitly identifies the GP register as the base register.

FIG. 16 illustrates an example 32-bit format of a store half instruction (SH [GP]) 1602 that implicitly identifies the GP register as the base register. This instruction causes the half word (i.e., two bytes) of data in a specified general-purpose register (rt) to be stored at the memory address (GP register+offset (u)). It can be seen that in this example ten bits (bits 0, 18-20 and 26-31) are used to identify the instruction as an SH [GP] instruction which leaves five bits (bits 21-25) to explicitly identify the general-purpose register (rt) and 18 bits for the offset (u) (17 specified bits plus bit 0 which must be zero to be half-word aligned). This allows a range of $2^{18}$ addresses from the GP to be directly accessed via this instruction. For comparison, a generic store half instruction (SH [Generic]) 1604 that requires explicit identification of the base register (rs) has only a 12-bit offset (u) since ten bits (bits 12-15 and 26-31) are used to identify the instruction as an SH [Generic] instruction and five bits (bits 16-20) are used to explicitly identify the base register (rs). Accordingly, the SH [GP] instruction increases the address range that can be accessed with this instruction by a factor of $2^6$.

Figure 17:
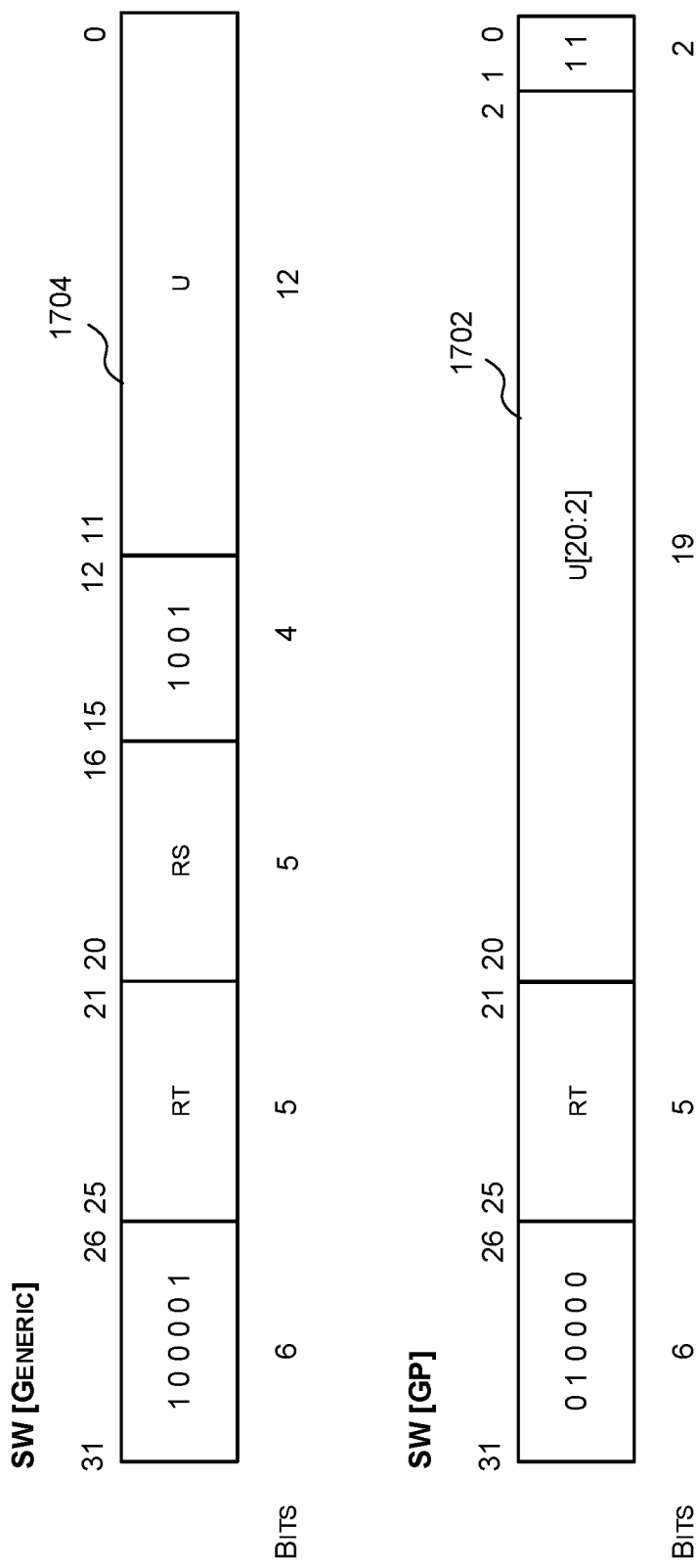
FIG. 17 is a schematic diagram of an example 32-bit format of a store word instruction that implicitly identifies the GP register as the base register.

FIG. 17 illustrates an example 32-bit format of a store word instruction (SW [GP]) 1702 that implicitly identifies the GP register as the base register. This instruction causes the word (i.e., four bytes) of data in a specified general-purpose register (rt) to be stored at the memory address (GP register+offset (u)). It can be seen that in this example only eight bits (bits 0-1 and 26-31) are used to identify the instruction as a SW [GP] instruction which leaves five bits (bits 21-25) to explicitly identify the general-purpose register (rt) and 21 bits for the offset (u) (19 specified bits plus bits 0 and 1 which must be zero to be word aligned). This allows a range of $2^{21}$ addresses from the GP to be directly accessed via this instruction. For comparison, a generic store word instruction (SW [Generic]) 1704 that requires explicit identification of the base register (rs) has only a 12-bit offset (u) since ten bits (bits 12-15 and 26-31) are used to identify the instruction as a SW [Generic] instruction and five bits (bits 16-20) are used to explicitly identify the base register (rs). Accordingly, the SW[GP] instruction increases the address range that can be accessed with this instruction by a factor of $2^9$.

Figure 18:
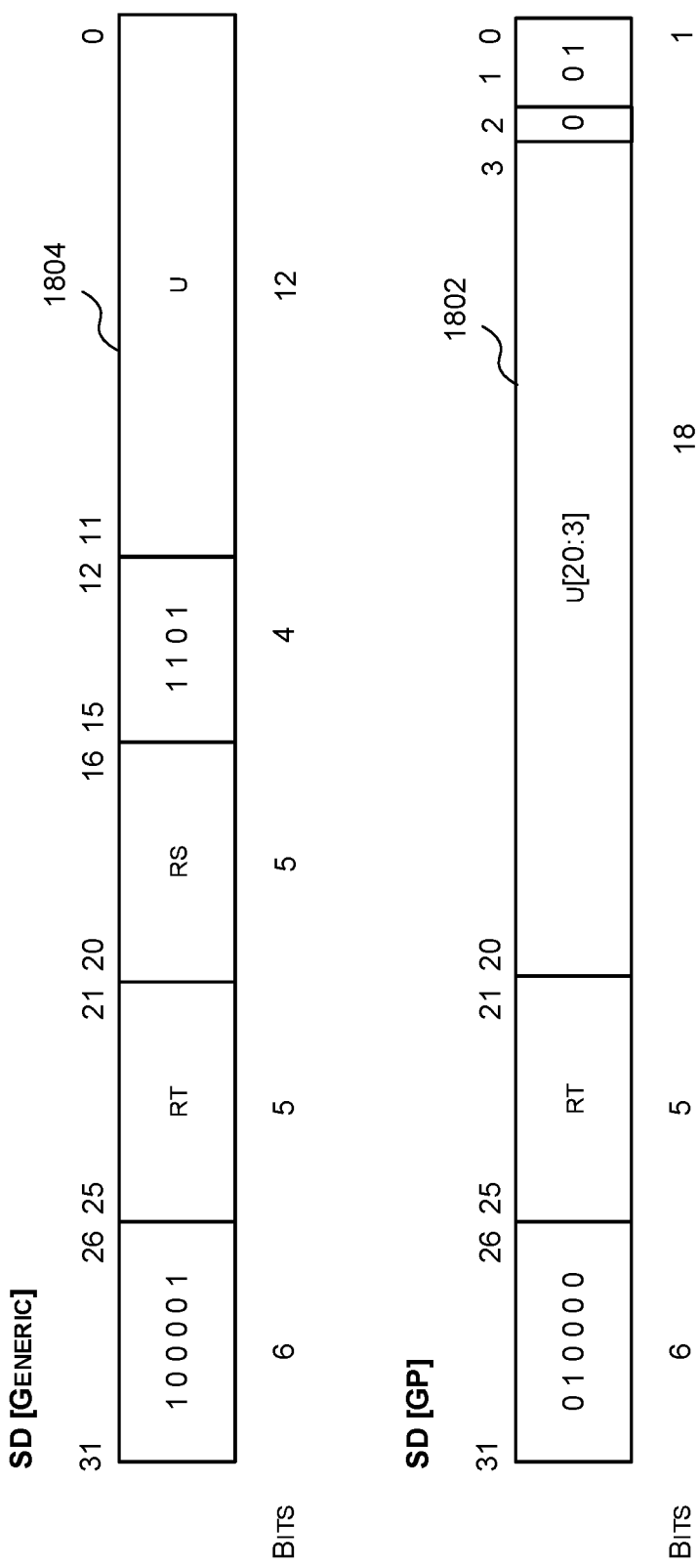
FIG. 18 is a schematic diagram of an example 32-bit format of a store double instruction that implicitly identifies the GP register as the base register.

FIG. 18 illustrates an example 32-bit format of a store double instruction (SD [GP]) 1802 that implicitly identifies the GP register as the base register. This instruction causes the word (i.e., four bytes) of data in a specified general-purpose register (rt) to be stored at the memory address (GP register+offset (u)). It can be seen that in this example only nine bits (bits 0-2 and 26-31) are used to identify the instruction as a SD [GP] instruction which leaves five bits (bits 21-25) to explicitly identify the general-purpose register (rt) and 21 bits for the offset (u) (18 specified bits plus bits 0-2 which must be zero to be word aligned). This allows a range of $2^{21}$ addresses from the GP to be directly accessed via this instruction. For comparison, a generic store double instruction (SD [Generic]) 1804 that requires explicit identification of the base register (rs) has only a 12-bit offset (u) since ten bits (bits 12-15 and 26-31) are used to identify the instruction as a SD [Generic] instruction and five bits (bits 16-20) are used to explicitly identify the base register (rs). Accordingly, the SD [GP] instruction increases the address range that can be accessed with this instruction by a factor of $2^9$.

Figure 19:
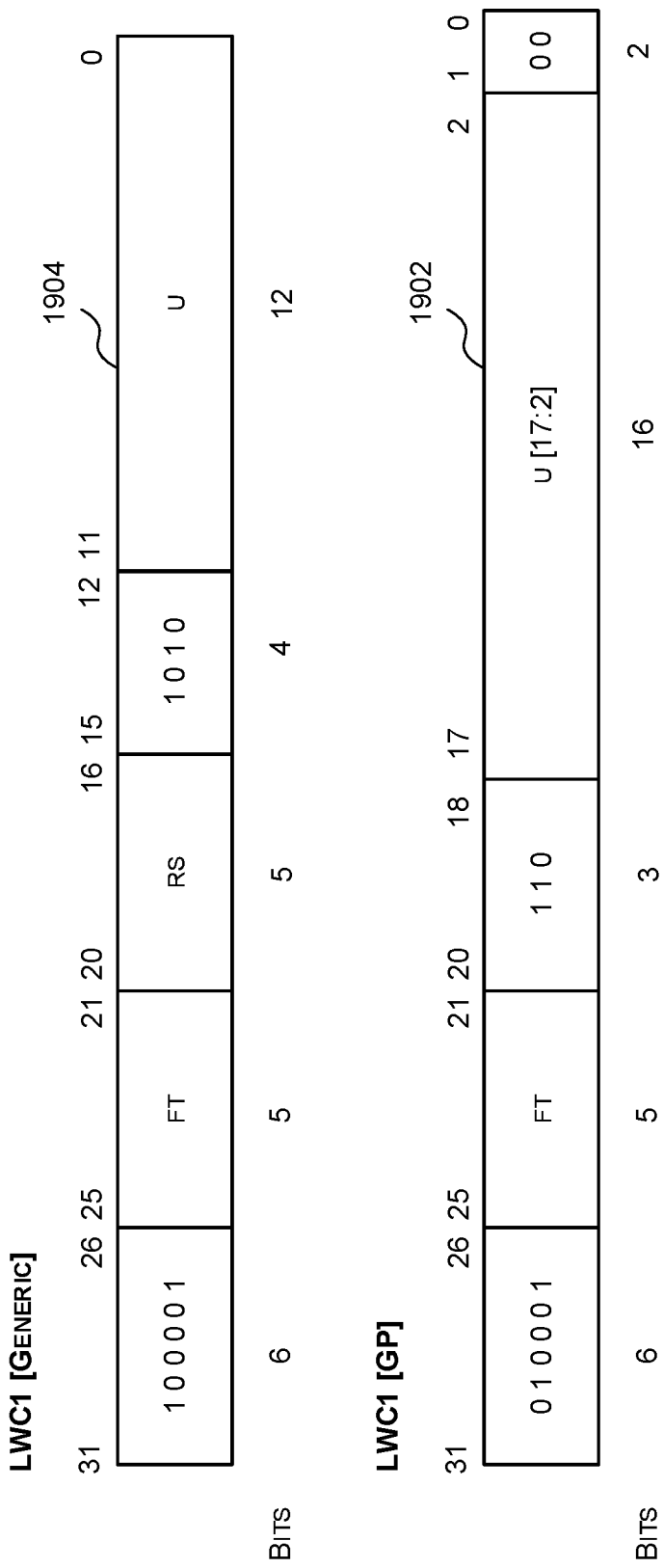
FIG. 19 is a schematic diagram of an example 32-bit format of a load word floating point instruction that implicitly identifies the GP register as the base register.
Figure 20:
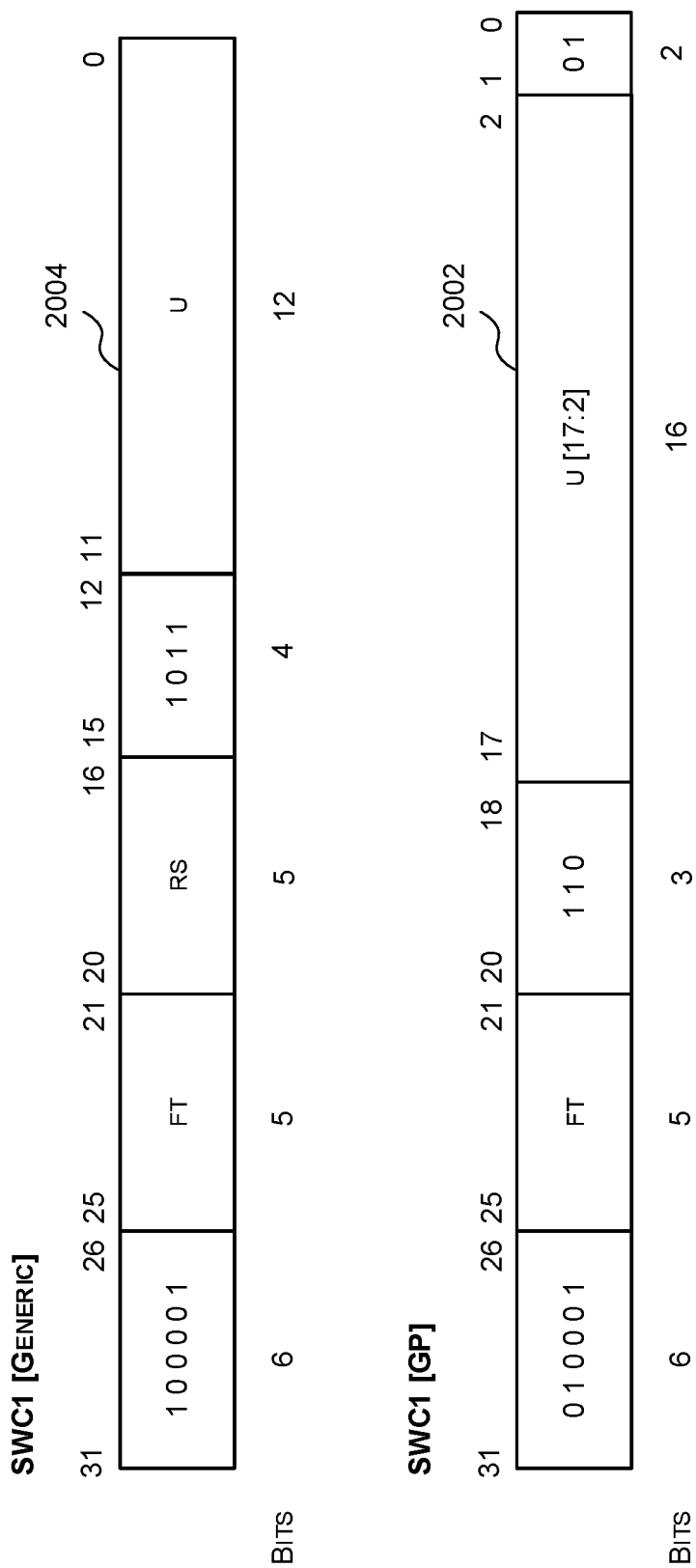
FIG. 20 is a schematic diagram of an example 32-bit format of a store word floating point instruction that implicitly identifies the GP register as the base register.
Figure 21:
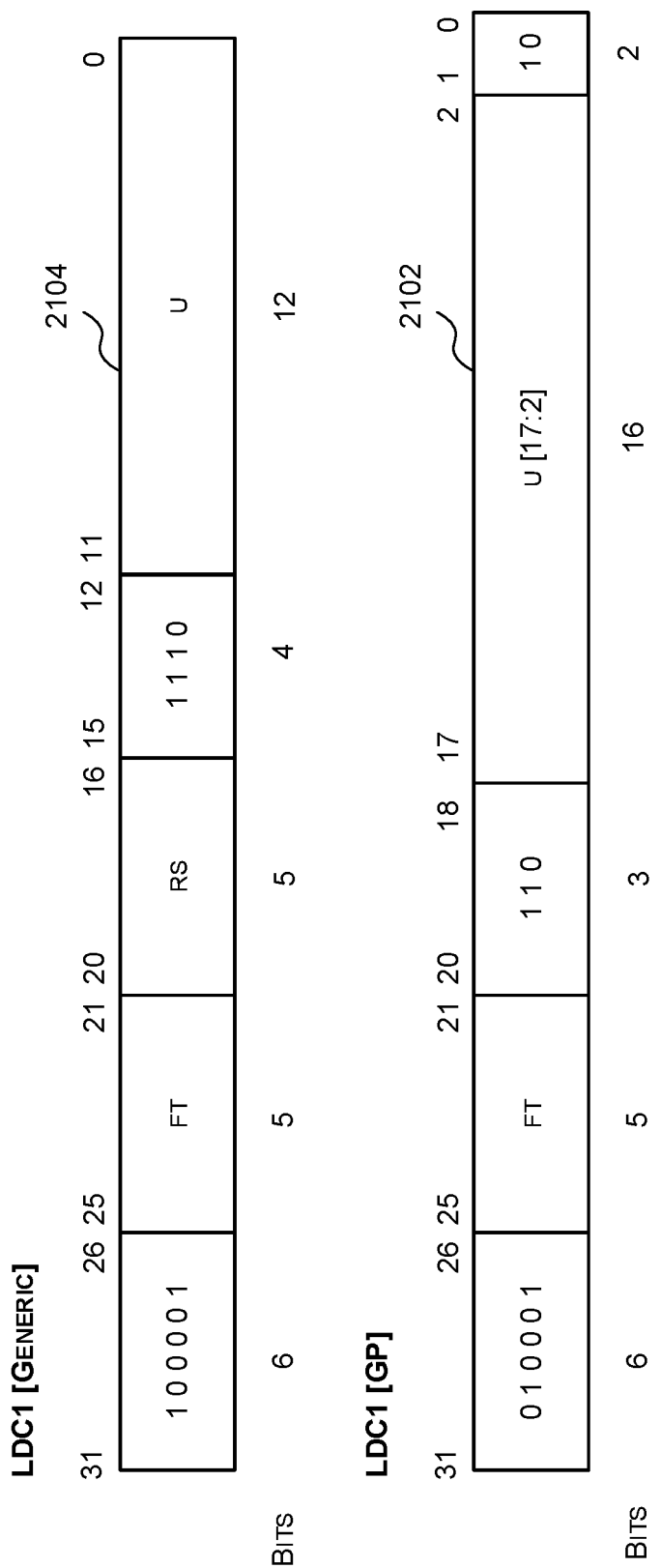
FIG. 21 is a schematic diagram of an example 32-bit format of a load double floating point instruction that implicitly identifies the GP register as the base register.
Figure 22:
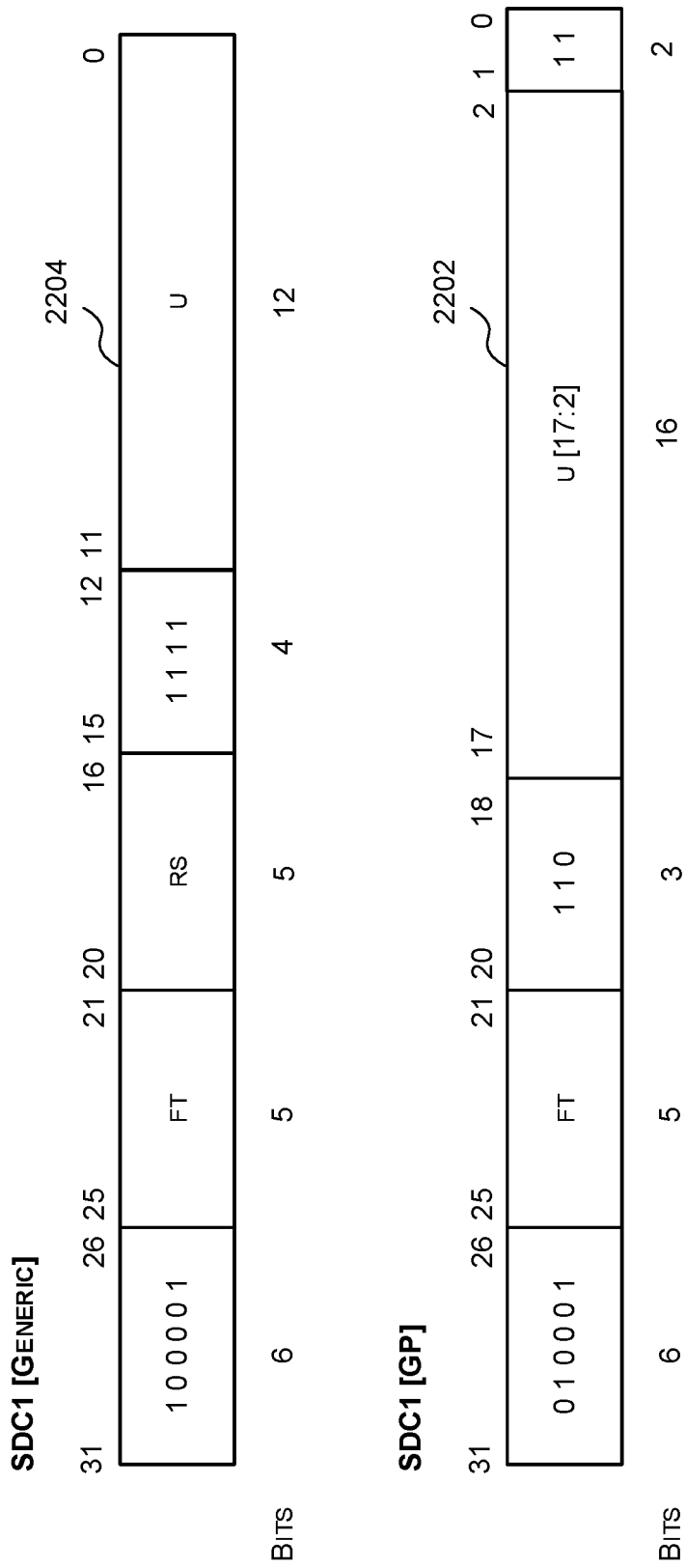
FIG. 22 is a schematic diagram of an example 32-bit format of a store double floating point instruction that implicitly identifies the GP register as the base register.

FIGS. 19-22 illustrate example 32-bit formats of load and store floating point instructions that implicitly identify the GP register as the base register. FIG. 19 illustrates an example 32-bit format of a load word floating point instruction (LWC1 [GP]) 1902, FIG. 20 illustrates an example 32-bit format of a store word floating point instruction (SWC1 [GP]) 2002, FIG. 21 illustrates an example 32-bit format of a load double floating point instruction (LDC1 [GP]) 2102, and FIG. 22 illustrates an example 32-bit format of a store double floating point instruction (SDC1 [GP]) 2202. The load instructions 1902 and 2102 cause the word (i.e., four bytes) or double (i.e., eight bytes) at the memory address (GP register+offset (u)) to be loaded into a specified floating point register (ft); and the store instructions 2002 and 2202 cause the word (i.e., four bytes) or double (i.e., eight bytes) of data in a specified floating point register (ft) to be stored at the memory address (GP register+offset (u)). In each of these examples only 11 bits (bits 0-1, 18-20 and 26-31) are used to identify the instruction as a LWC1 [GP]/SWC1 [GP]/LDC1 [GP]/SDC1 [GP] instruction which leaves five bits (bits 21-25) to explicitly identify the floating point register (ft) and 18 bits for the offset (u) (16 specified bits plus bits 0-1 which must be zero to be word aligned). This allows a range of $2^{18}$ addresses from the GP to be directly accessed via this instruction. For comparison, generic versions of these instructions 1904, 2004, 2104, 2204 that require explicit identification of the base register (rs) have only a 12-bit offset (u) since ten bits (bits 12-15 and 26-31) are used to identify the instruction and five bits (bits 16-20) are used to explicitly identify the base register (rs). Accordingly, the [GP] versions of these instructions increase the address range that can be accessed by a factor of $2^6$.

Figure 23:
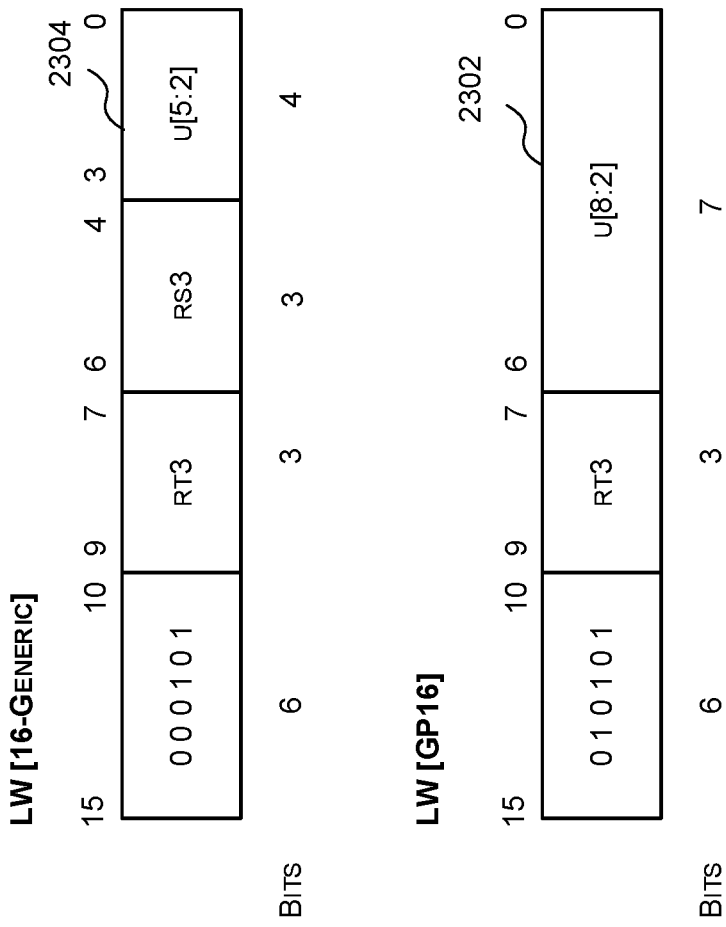
FIG. 23 is a schematic diagram of an example 16-bit format of a load word instruction that implicitly identifies the GP register as the base register.

FIG. 23 illustrates an example 16-bit format of a load word instruction (LW [GP16]) 2302 that implicitly identifies the GP register as the base register. This instruction causes the double word (i.e., eight bytes) of data stored at the memory address (GP register+offset (u)) to be stored in the specified general-purpose register. It can be seen that in this example only six bits (bits 10-15) are used to identify the instruction as a LW [GP16] instruction which leaves three bits (bits 7-9) to explicitly identify the general-purpose register (rt) and nine bits for the offset (u) (seven specified bits plus bits 0 and 1 which must be zero to be word aligned). This allows a range of $2^9$ addresses from the GP to be directly accessed via this instruction. For comparison, a generic 16-bit load word instruction (LW [16-Generic]) 2304 that requires explicit identification of the base register (rs3) has only a 7-bit offset (u) (four explicit bit plus bits 0 and 1 which must be zero to be word aligned) since six bits (bits 10-15) are used to identify the instruction as a LW [16-Generic] instruction and three bits (bits 7-9) are used to explicitly identify the base register (rs3). Accordingly, the LW [GP16] instruction increases the address range that can be accessed with this instruction by a factor of $2^3$.

Figure 24:
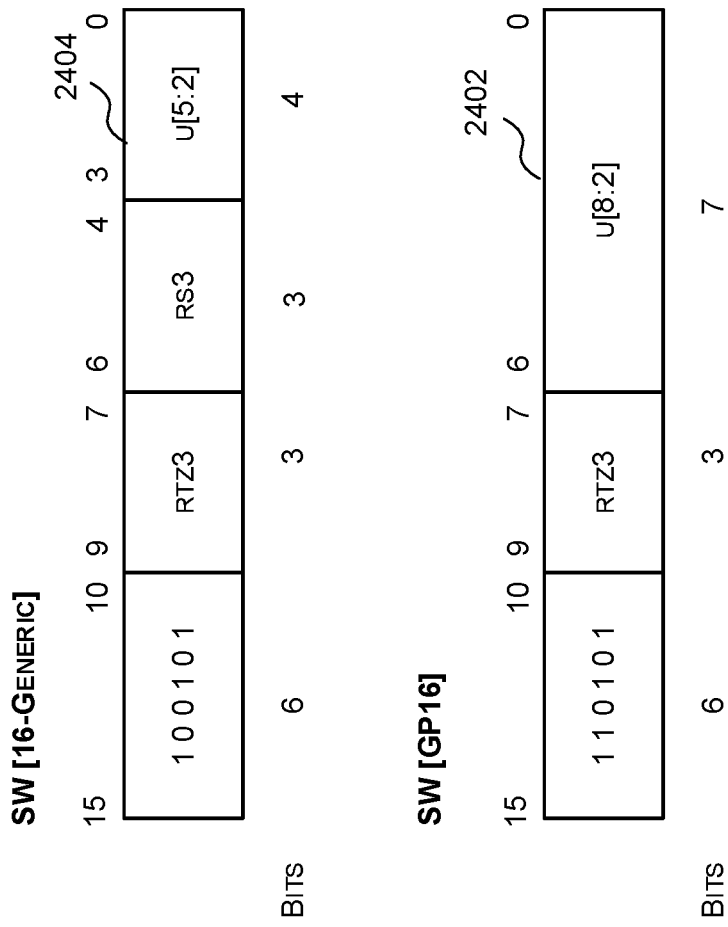
FIG. 24 is a schematic diagram of an example 16-bit format of a store word instruction that implicitly identifies the GP register as the base register.

FIG. 24 illustrates an example 16-bit format of a store word instruction (SW [GP16]) 2402 that implicitly identifies the GP register as the base register. This instruction causes the word (i.e., four bytes) of data in a specified general-purpose register (rtz3) to be stored at the memory address (GP register+offset (u)). It can be seen that in this example only 6 bits (bits 10-15) are used to identify the instruction as a SW [GP16] instruction which leaves three bits (bits 7-9) to explicitly identify the general-purpose register (rtz3) and nine bits for the offset (u) (seven specified bits plus bits 0 and 1 which must be zero to be word aligned). This allows an address range of $2^9$ addresses from the GP to be directly accessed via this instruction. For comparison, a generic 16-bit store word instruction (SW [16-Generic]) 2404 that requires explicit identification of the base register (rs3) has only a 6-bit offset (u) since six bits (bits 10-15) are used to identify the instruction as a SW [16-Generic] instruction and three bits (bits 4-6) are used to explicitly identify the base register (rs3). Accordingly, the SW [GP16] instruction increases the address range that can be accessed with this instruction by a factor of $2^3$.

Figure 25:
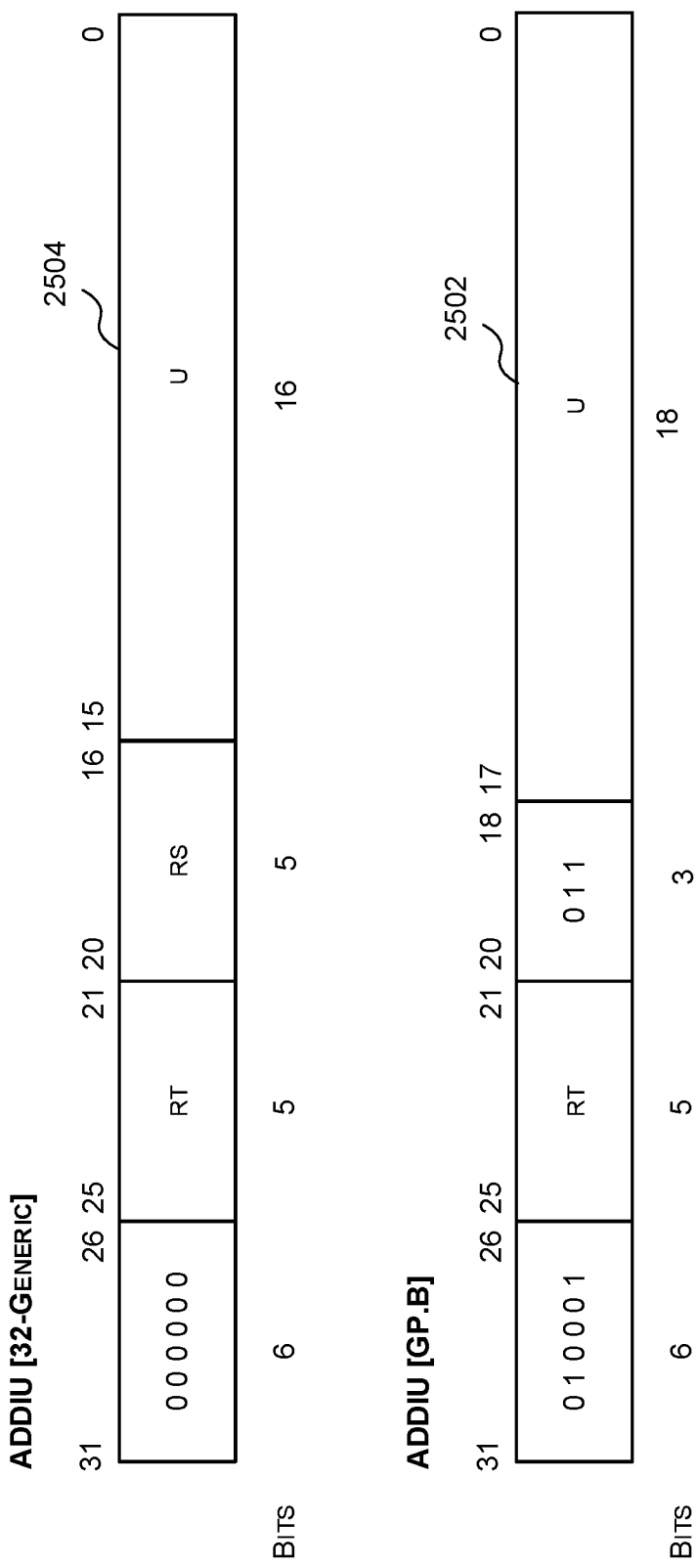
FIG. 25 is schematic diagram of an example 32-bit format of an add immediate (byte) instruction that implicitly identifies the GP register as the source register.

FIG. 25 illustrates an example 32-bit format of an add immediate instruction (ADDIU [GP.B]) 2502 that implicitly identifies the GP register as the source register. This instruction causes the address of a byte of memory to be calculated from the GP plus a specified immediate (u). It can be seen that in this example nine bits (bits 18-20, 26-31) are used to identify the instruction as an ADDIU [GP.B] instruction which leaves five bits (bits 21-25) to explicitly identify the general-purpose register (rt) and 18 bits (bits 0-17) for the immediate (u). This allows a range of $2^{18}$ addresses from the GP to be directly generated via this instruction. For comparison, a generic add immediate unsigned instruction (ADDIU [32-Generic]) 2504 that requires explicit identification of the source register (rs) has only a 16-bit immediate (u) since six bits (bits 26-31) are used to identify the instruction as an ADDIU [32-generic] instruction and five bits (bits 16-20) are used to explicitly identify the source register (rs). Accordingly, the ADDIU [GP.B] instruction increases the address range that can be generated with this instruction by a factor of $2^2$.

Figure 26:
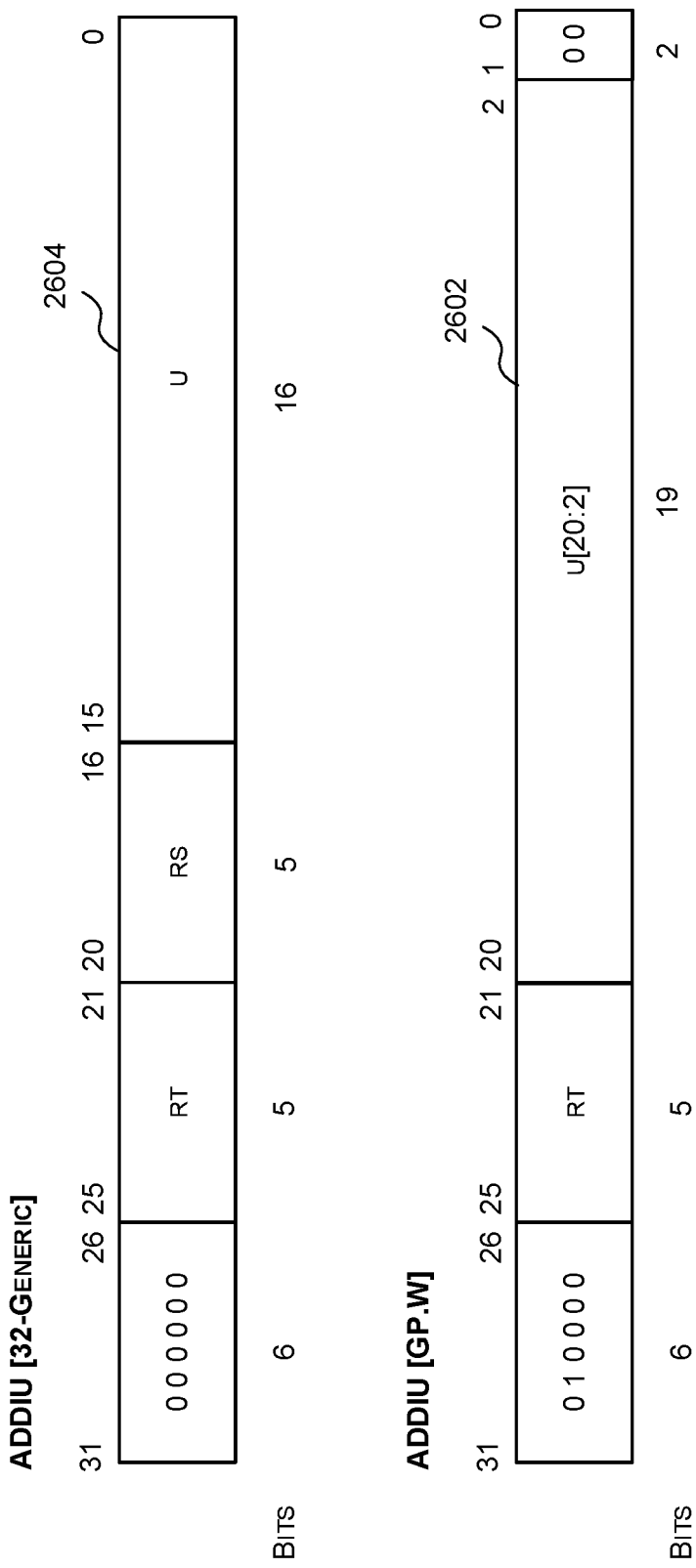
FIG. 26 is a schematic diagram of an example 32-bit format of an add immediate (word) instruction that implicitly identifies the GP register as the source register.

FIG. 26 illustrates an example 32-bit format of an add immediate instruction (ADDIU [GP.W]) 2602 that implicitly identifies the GP register as the source register. This instruction causes the address of a word of memory to be calculated from the GP plus a specified immediate (u). It can be seen that in this example eight bits (bits 0-1, 26-31) are used to identify the instruction as an ADDIU [GP.W] instruction which leaves five bits (bits 21-25) to explicitly identify the general-purpose register (rt) and 21 bits for the immediate (u) (19 specified bits plus bits 0 and 1 which must be zero to be word aligned). This allows an address range of $2^{21}$ addresses from the GP to be directly generated via this instruction. For comparison, a generic add immediate unsigned instruction (ADDIU [32-Generic]) 2604 that requires explicit identification of the source register (rs) has only a 16-bit immediate (u) since six bits (bits 26-31) are used to identify the instruction as an ADDIU [32-generic] instruction and five bits (bits 16-20) are used to explicitly identify the source register (rs). Accordingly, the ADDIU [GP.W] instruction increases the address range that can be generated with this instruction by a factor of $2^5$.

Figure 27:
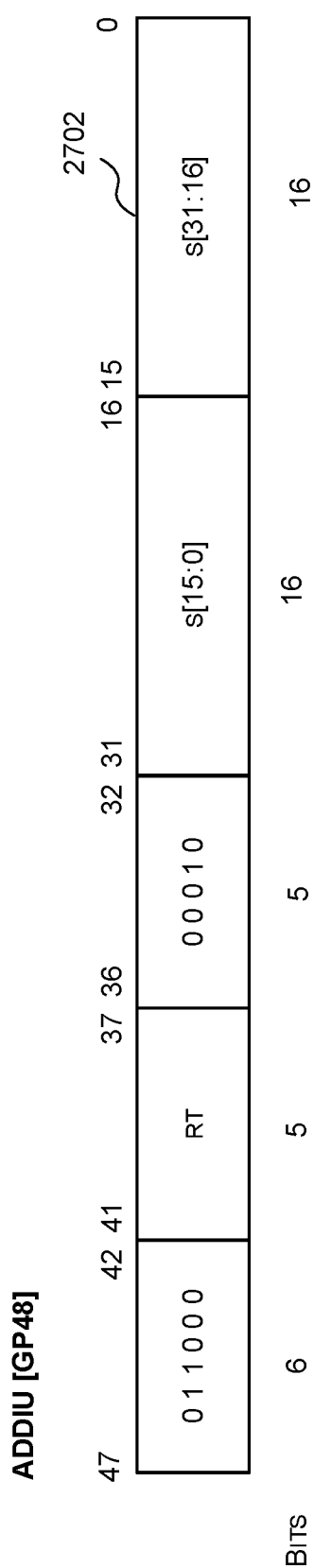
FIG. 27 is a schematic diagram of an example 48-bit format of an add immediate instruction that implicitly identifies the GP register as the source register.

FIG. 27 illustrates an example 48-bit format of an add immediate instruction (ADDIU [GP48]) 2702 that implicitly identifies the GP register as the source register. This instruction causes the address of memory to be calculated from the GP plus a specified immediate (u) and stored in a specified general-purpose register. It can be seen that in this example 11 bits (bits 32-36, 42-47) are used to identify the instruction as an ADDIU [GP48] instruction which leaves five bits (bits 37-41) to explicitly identify the general-purpose register (rt) and 32 bits for the offset (u). This allows an address range of $2^{32}$ addresses from the GP to be directly generated via this instruction which is the entire addressable memory in a 32-bit address space.

FIG. 28 illustrates an example 32-bit format of an add immediate program counter instruction (ADDIUPC [32]) 2802 that implicitly identifies the program counter as the source register. This instruction causes an address of memory to be calculated from the next program counter plus a specified signed immediate (s) and stored in a specified general-purpose register (rt). It can be seen that in this example six bits (bits 26-31) are used to identify the instruction as an ADDIUPC [32] instruction which leaves five bits (bits 21-25) to explicitly identify the general-purpose register (rt) and 22 bits for the offset (u) (21 specified bit plus bit 0 which is set to zero). This allows an address range of $2^{22}$ addresses from the GP to be directly generated via this instruction.

FIG. 29 illustrates an example 32-bit format of an add immediate program counter instruction (ALUIPC) 2902 that implicitly identifies the program counter as the source register. This instruction causes an aligned address at an upper 20-bit immediate offset from the next program counter to be calculated and stored in a specified general-purpose register (rt). It can be seen that in this example seven bits (bits 1, 26-31) are used to identify the instruction as an ALUIPC instruction which leaves five bits (bits 21-25) to explicitly identify the general-purpose register (rt) and 20 bits to specify the immediate. This allows a 4 KB aligned address to be generated from the program counter.

Figure 30:
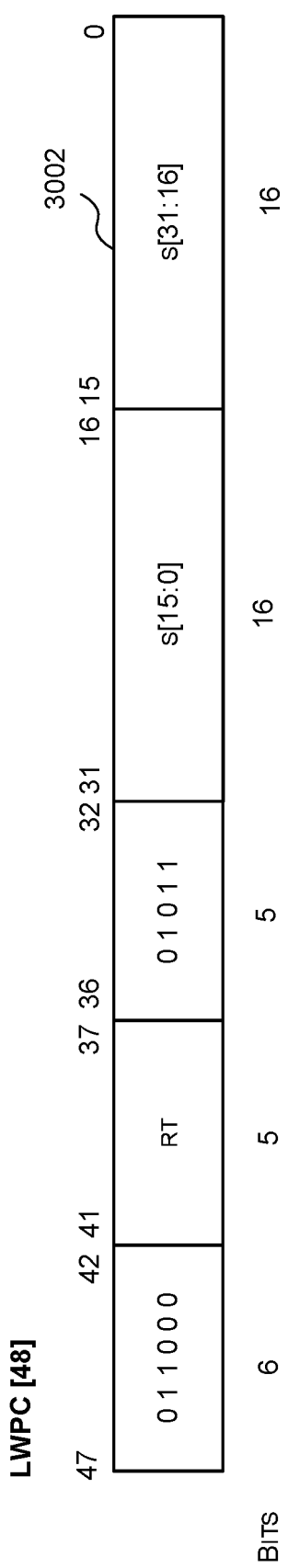
FIG. 30 is a schematic diagram of an example 48-bit format of a load word program counter instruction that implicitly identifies the program counter as the base register.

FIG. 30 illustrates an example 48-bit format of a load word program counter instruction (LWPC [48]) 3002 that implicitly identifies the program counter as the base register. This instruction causes the word at memory address (program counter+offset (s)) to be loaded into a specified general-purpose register. It can be seen that in this example, 11 bits (bits 32-36, 42-47) are used to identify the instruction as a LWPC [48] instruction which leaves five bits (bits 37-41) to explicitly identify the general-purpose register (rt) and 32 bits for the offset (s). This allows an address range of $2^{32}$ addresses from the program counter to be directly accessed via this instruction which is any address in a 32-bit address space.

Figure 31:
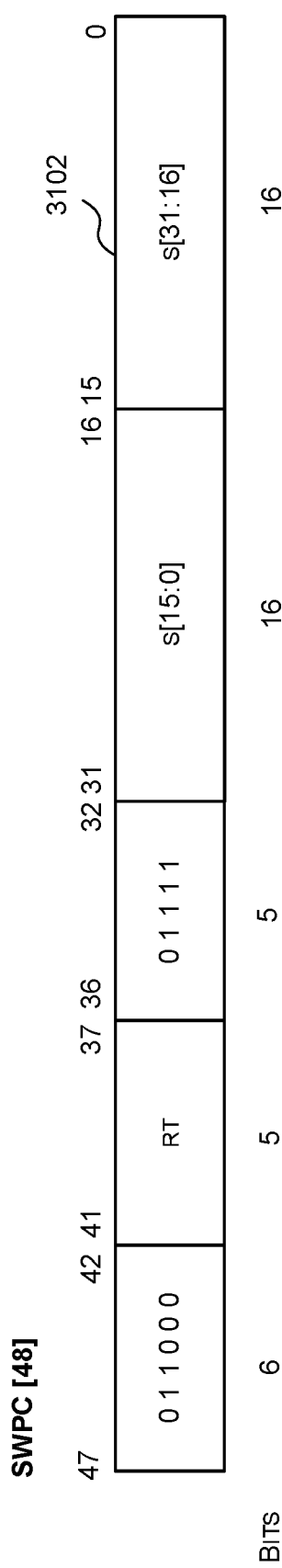
FIG. 31 is a schematic diagram of an example 48-bit format of a store word program counter instruction that implicitly identifies the program counter as the base register.

FIG. 31 illustrates an example 48-bit format of a store word program counter instruction (SWPC [48]) 3102 that implicitly identifies the program counter as the base register. This instruction causes the word in a specified general-purpose register (rt) to be stored at the memory address (program counter+offset (s)). It can be seen that in this example, 11 bits (bits 32-36, 42-47) are used to identify the instruction as a SWPC [48] instruction which leaves five bits (bits 37-41) to explicitly identify the general-purpose register (rt) and 32 bits for the offset (s). This allows an address range of $2^{32}$ addresses from the program counter to be directly accessed via this instruction which is any address in a 32-bit address space.

The data processing apparatus of FIG. 5 is shown as comprising a number of functional blocks. This is schematic only and is not intended to define a strict division between different logic elements of such entities. Each functional block may be provided in any suitable manner. It is to be understood that intermediate values described herein as being formed by the data processing apparatus need not be physically generated by the data processing apparatus at any point and may merely represent logical values which conveniently describe the processing performed by the data processing apparatus between its input and output.

The data processing apparatus described herein may be embodied in hardware on an integrated circuit. The data processing apparatus described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e., run) in an integrated circuit manufacturing system configures the system to manufacture a data processing apparatus configured to perform any of the methods described herein, or to manufacture a data processing apparatus comprising any apparatus described herein. An integrated circuit definition dataset may be, for example, an integrated circuit description.

Therefore, there may be provided a method of manufacturing, at an integrated circuit manufacturing system, a data processing apparatus as described herein. Furthermore, there may be provided an integrated circuit definition dataset that, when processed in an integrated circuit manufacturing system, causes the method of manufacturing a data processing apparatus to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g., providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing apparatus will now be described with respect to FIG. 33.

Figure 33:
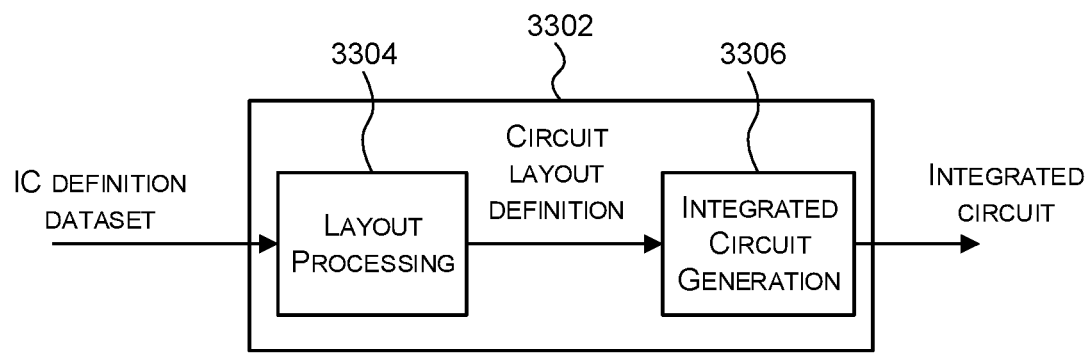
FIG. 33 is a block diagram of an example integrated circuit manufacturing system for generating an integrated circuit embodying the data processing apparatus described herein.

FIG. 33 shows an example of an integrated circuit (IC) manufacturing system 3302 which is configured to manufacture a data processing apparatus as described in any of the examples herein. In particular, the IC manufacturing system 3302 comprises a layout processing system 3304 and an integrated circuit generation system 3306. The IC manufacturing system 3302 is configured to receive an IC definition dataset (e.g., defining a data processing apparatus as described in any of the examples herein), process the IC definition dataset, and generate an IC according to the IC definition dataset (e.g., which embodies a data processing apparatus as described in any of the examples herein). The processing of the IC definition dataset configures the IC manufacturing system 3302 to manufacture an integrated circuit embodying a data processing apparatus as described in any of the examples herein.

The layout processing system 3304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g., in terms of logical components (e.g., NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system 3304 has determined the circuit layout, it may output a circuit layout definition to the IC generation system 3306. A circuit layout definition may be, for example, a circuit layout description.

The IC generation system 3306 generates an IC according to the circuit layout definition, as is known in the art. For example, the IC generation system 3306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 3306 may be in the form of computer-readable code which the IC generation system 3306 can use to form a suitable mask for use in generating an IC.

The different processes performed by the IC manufacturing system 3302 may be implemented all in one location, e.g., by one party. Alternatively, the IC manufacturing system 3302 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing apparatus without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g., by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 33 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 33, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Figure 34:
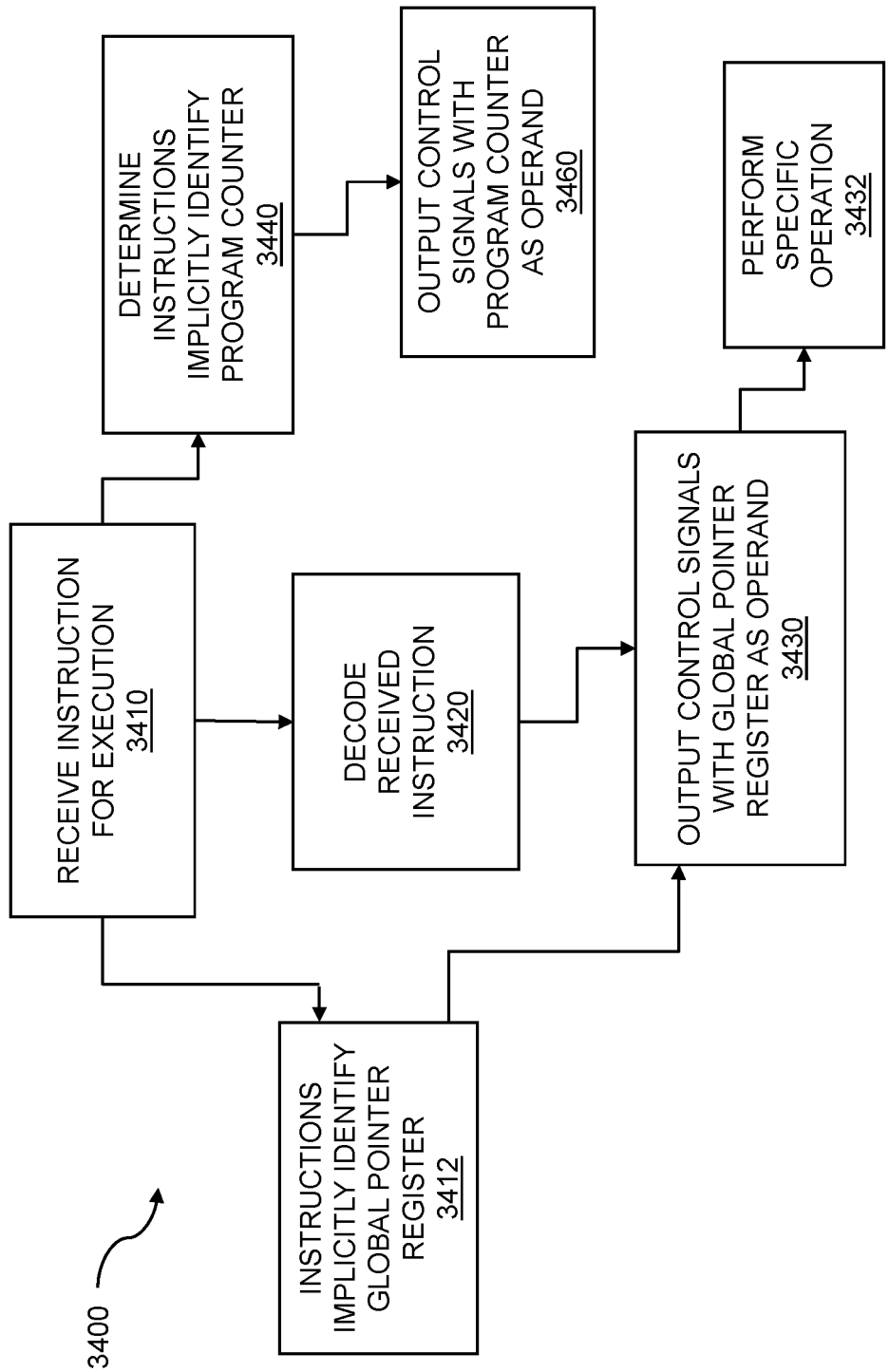
FIG. 34 is a flow diagram for decoding instructions at a data processing apparatus.

FIG. 34 is a flow diagram for decoding instructions at a data processing apparatus. Decoding instructions can include addresses of operands, where the operands can be located in global memory. In embodiments, the decoding instructions can include implicit GP relative addressing for global memory access. The flow 3400 includes receiving, at a decode unit, an instruction for execution 3410 by an execution unit of the data processing apparatus that specifies an operation to be performed. The data processing apparatus can include various computational architecture techniques, where the computational architecture techniques are based on corresponding instruction sets. In embodiments, the data processing apparatus can be a RISC. The instructions can include Boolean operations, arithmetic operations, vector operations, tensor operations, and data manipulation operations such as load, store, shift, rotate, complement, and so on. The instructions can take as inputs unsigned values, signed magnitude values, characters, integers, floating point values, radix point values (fixed or variable radix point), and the like. The instructions can enable or disable control signals, fire interrupts, handle interrupts, etc. The received instruction can be an instruction from an instruction set comprising one or more instructions that implicitly identify a GP register 3412 as an operand of the instruction. The GP register can store an address of global memory in which data is stored. The address that can be stored within the GP register can include an address, an immediate address, a relative address, or the like.

As discussed throughout, the GP register can be a register that can be configured or loaded with a value that can point to an address in memory. The address in memory can include data (rather than code), an address to further data such as an indirect address, a relative address or offset, and so on. The GP register can aid access to data in memory by providing a reference for storing or loading the data. The reference to the data provides access to the data, wherever the data is needed and by whichever processor, rather than having to explicitly transfer the data. The GP register may be accessed by more than one processor, thus further reducing data transfer requirements. In embodiments, the GP register may be one of a plurality of general-purpose registers. The general-purpose registers can store instructions or data and may perform other operations such as accumulation. In other embodiments, the GP register can be a dedicated register separate from the general-purpose registers discussed elsewhere or can be a specific general-purpose register. For techniques in which the general-purpose register is a specific general-purpose register, the general-purpose register can be defined (e.g., by software convention or the ISA) as the register used to store the GP address. How the GP register is configured and used to access data in memory may differ based on the type of code being run on the data processing apparatus. In particular, the use and contents of the GP register may depend on whether the code is PIC or regular, position dependent code (non-position-independent code).

The flow 3400 includes decoding, at the decode unit, the received instruction 3420 to determine whether the received instruction is one of the one or more instructions that implicitly identify the GP register as an operand of the instruction. The GP register can include data, an address, an indirect address, a relative address, an index, and so on. The global point register can include an operand. In embodiments, the one or more instructions that implicitly identify the GP register as an operand of the instruction include one or more register arithmetic instructions that implicitly identify the GP register as a source register of the instruction. Register arithmetic instructions can include addition, subtraction, multiplication, division, shifting, rotating, complementing, and the like, In other embodiments, the one or more register arithmetic instructions can include a first register arithmetic instruction to add an immediate value in a first unit to the address of the GP register, and a second register arithmetic instruction to add an immediate value in a second unit to the address of the GP register. The first immediate value and the second immediate value can include indexes, offset, indirections, etc. In embodiments, the one or more register arithmetic instructions comprise at least two register arithmetic instructions with different bit lengths. As discussed throughout, the different bit lengths for the register arithmetic instructions may be due to register arithmetic instructions including immediate values; relative, indexed, or offset values; register addresses; and the like. In further embodiments, the one or more load instructions include a first load instruction to load data of a first size from the global memory, and a second load instruction to load data of a second size from the global memory. The data sizes can include bits, nibbles, or bytes; words or fractions of words such as half-words, quarter-words, etc.; multiple words, where the multiple words may represent long variable values, floating-point values; and so on.

In embodiments, the first load instruction can have a different number of offset bits than the second load instruction. The offset bits can determine an index or relative address. The different number of offset bits may result from load instructions that access different data types, where the different data types can include bit, byte, or word; integer, real, or float; character; etc. In embodiments, the one or more load instructions comprise at least two load instructions with different bit lengths. The different load instruction bit lengths can be based on immediate data that can be included within the instruction. The immediate data can include bytes, fractions of words, words, etc. In embodiments, the one or more load instructions can include one or more load instructions to load data into a first type of register and one or more load instructions to load data into a second type of register. The first register and the second register can include general-purpose registers, special-purpose registers, accumulators, local pointer registers, GP registers, etc.

Instructions other than load instructions can be executed. Recall that the value within a given GP register can include an immediate value, an indirection, and index, an offset, a displacement, and the like. The one or more instructions, when executed, can perform load operations, store operations, etc. In embodiments, one or more displacement memory access instructions can include one or more store instructions. The one or more store instructions can store data of various sizes such as bit, byte, fraction of word, word, multiple word, etc. The one or more store instructions can also store data including a variety of data types such as unsigned, signed magnitude, two's complement, real, floating-point, character, string, and the like. In other embodiments, the one or more store instructions can include a first store instruction to store data of a first size in the global memory, and a second store instruction to store data of a second size in the global memory. As discussed throughout, the different data sizes can result from different data types, different numerical precisions, etc. In further embodiments, the first store instruction can have a different number of offset bits than the second store instruction. The different number of offset bits can be related to different data types, different data precisions, and the like. In other embodiments, the one or more store instructions can include at least two store instructions with different bit lengths. Other numbers of store instructions can further include more than two store instructions with different bit lengths.

In response to determining, at the decode unit, that the received instruction is one of the one or more instructions that implicitly identify a GP register 3412 as an operand of the instruction, the flow 3400 includes outputting one or more control signals 3430. The control signals can include one or more fire signals, one or more done signals, etc. The control signals can include interrupt signals. The outputting of the control signals can cause the execution unit to perform the specified operation 3432 with the GP register as an operand. The specific operation can include a Boolean operation, an arithmetic operation, a vector operation, a tensor operation, a data transfer operation, etc. The number of bits in the received instruction can depend on the type of instruction, the type of data, if any, upon which the instruction operates, etc. The number of bits in the received instruction can depend on the type of register with which the instruction interacts. In embodiments, the one or more instructions that implicitly identify the GP register as an operand of the instruction can include one or more displacement memory access instructions. The displacement memory access instructions can implicitly identify the GP register as a base register of the instruction. When the received instruction is one of the one or more displacement memory access instructions, the one or more control signals cause the execution unit to perform an access of an address of the global memory based on the address stored in the GP register and an offset specified in the received instruction. The one or more displacement memory access instructions can include one or more load instructions, one or more store instructions, etc. As has been the case for the various registers, a number of bits of the received instruction allocated to the offset can be greater than a number of bits allocated to an offset in a corresponding displacement memory access instruction that explicitly identifies the base register. The excess bits can be ignored, can be used to access a corresponding displacement memory from a plurality of displacement memories, or the like.

Registers, global registers, GP registers, and so on, have been discussed, where the various registers can contain an operand of an instruction. Other registers similarly may be used to contain an operand of an instruction. In embodiments, the one or more store instructions can include one or more store instructions to store data from a first type of register and one or more store instructions to store data from a second type of register. The instruction set can further include one or more instructions that implicitly identify a program counter of the data processing apparatus as an operand of the instruction. The program counter can be a program counter for tracking decoding or executing instructions from a program that can include multiple threads or can be executed on multiple processors, a program counter for enumerating the decoding and executing instructions on a given processor, etc. The flow 3400 includes determining whether the received instruction is one of the one or more instructions that implicitly identify the program counter 3440 as an operand of the instruction. The program counter can be implemented as a register or by using another architectural technique, and can store an instruction count, an instruction, data, and so on. In embodiments, the one or more instructions that implicitly identify the program counter as an operand of the instruction includes an instruction to cause an aligned address at an upper N-bit immediate offset from the program counter to be calculated, where N is an integer greater than two. In response to determining that the received instruction is one of one or more instructions that implicitly identify a program counter of the data processing apparatus as an operand of the instruction, the flow 3400 includes outputting 3460 one or more control signals to cause the execution unit to perform the operation with the program counter as an operand. The control signals can include one or more fire signals, one or more done instructions, one or more interrupts, and the like.

Figure 35:
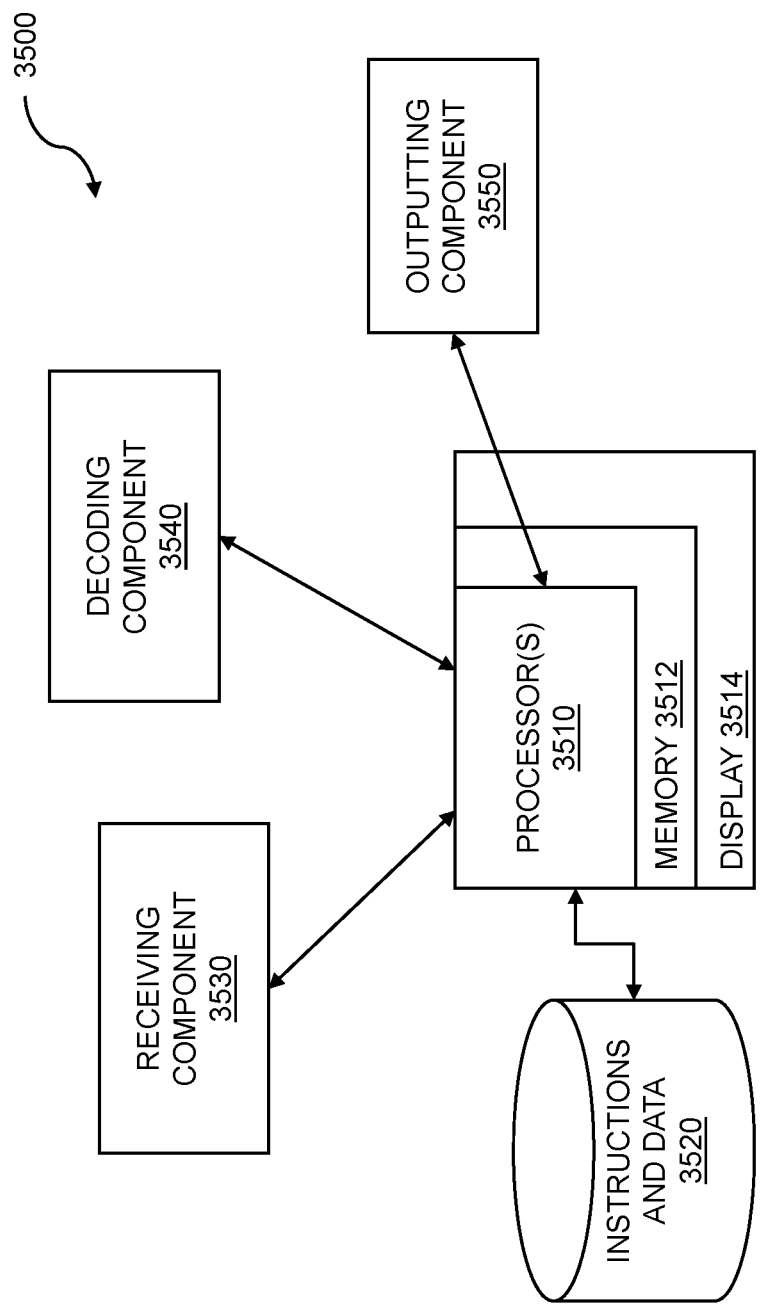
FIG. 35 is a diagram of a system for decoding instructions at a data processing apparatus.

FIG. 35 is a diagram of a system for decoding instructions at a data processing apparatus. The system 3500 can include one or more processors 3510 coupled to a memory 3512 which stores instructions. The system 3500 can include a display 3514 coupled to the one or more processors 3510 for displaying data, intermediate steps, instructions, GP registers, program counters, instruction counters, and so on. In embodiments, one or more processors 3510 are attached to the memory 3512 where the one or more processors, when executing the instructions which are stored, are configured to: receive, at a decode unit, an instruction for execution by an execution unit of the data processing apparatus that specifies an operation to be performed, the received instruction being an instruction from an instruction set comprising one or more instructions that implicitly identify a GP register as an operand of the instruction, the GP register storing an address of global memory in which data is stored; decode, at the decode unit, the received instruction to determine whether the received instruction is one of the one or more instructions that implicitly identify the GP register as an operand of the instruction; and in response to determining, at the decode unit, that the received instruction is one of the one or more instructions that implicitly identify a GP register as an operand of the instruction, output one or more control signals to cause the execution unit to perform the specified operation with the GP register as an operand. Various steps in the flow 3400 may be changed in order, repeated, omitted, or the like without departing from the disclosed concepts.

The system 3500 can include a collection of instructions and data 3520. The instructions and data 3520 may be stored in a database, one or more statically linked libraries, one or more dynamically linked libraries, precompiled headers, source code, and so on. The instructions and data can include flow graphs, agents, or other suitable representations. The instructions can include instructions for implicit GP relative addressing for global memory access, where the processors can include processing elements in a reconfigurable fabric. The system 3500 can include a receiving component 3530. The receiving component can include functions and instructions for receiving, at a decode unit, an instruction for execution by an execution unit of the data processing apparatus that specifies an operation to be performed, the received instruction being an instruction from an instruction set comprising one or more instructions that implicitly identify a GP register as an operand of the instruction, the GP register storing an address of global memory in which data is stored. The global memory in which data is stored can include memory such as storage elements within a reconfigurable fabric, direct memory access (DMA) memory, a hybrid memory cube (HMC), a distributed memory, and so on. The system 3500 can include a decoding component

3540. The decoding component 3540 can include functions and instructions for decoding, at the decode unit, the received instruction to determine whether the received instruction is one of the one or more instructions that implicitly identify the GP register as an operand of the instruction. The instructions that can be decoded can include Boolean operations, arithmetic operations, data transfer instructions, and so on. The data transfer instructions can include load or store instructions, where the load or store instructions can load or store data of various types to local memory, registers such as GP registers, program counters, etc.

The system 3500 can include an outputting component 3550. The outputting component 3550 can output one or more control signals, where the one or more control signals can result in an operation being executed. In embodiments, in response to determining, at the decode unit, that the received instruction is one of the one or more instructions that implicitly identify a GP register as an operand of the instruction, the outputting component can output one or more control signals to cause the execution unit to perform the specified operation with the GP register as an operand. The decode unit can implicitly identify other components as an operand of an instruction. In embodiments, in response to determining that the received instruction is one of one or more instructions that implicitly identify a program counter of the data processing apparatus as an operand of the instruction, the outputting component outputs one or more control signals to cause the execution unit to perform the operation with the program counter as an operand.

The system 3500 can include a computer program product embodied in a non-transitory computer readable medium for decoding instructions at a data processing apparatus, the computer program product comprising code which causes one or more processors to perform operations of: receiving, at a decode unit, an instruction for execution by an execution unit of the data processing apparatus that specifies an operation to be performed, the received instruction being an instruction from an instruction set comprising one or more instructions that implicitly identifies a GP register as an operand of the instruction, and the GP register storing an address of global memory in which data is stored; decoding, at the decode unit, the received instruction to determine whether the received instruction is one of the one or more instructions that implicitly identify the GP register as an operand of the instruction; and in response to determining, at the decode unit, that the received instruction is one of the one or more instructions that implicitly identify a GP register as an operand of the instruction, outputting one or more control signals to cause the execution unit to perform the specified operation with the GP register as an operand.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions-generally referred to herein as a "circuit," "module," or "system"—may be implemented by computer program instructions, by special-purpose hardware-based computer systems, by combinations of special-purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for decoding instructions comprising:
   receiving, at a decode unit, an instruction in a form for execution by an execution unit that specifies an operation to be performed, the received instruction being an instruction from an instruction set comprising one or more instructions, wherein at a time the received instruction is executed to perform the specified operation:
      the received instruction comprises an opcode that identifies the type of operation to be performed;
      the received instruction implicitly identifies a base register for the instruction;
      a total number of bits in the received instruction that implicitly identify the base register or identify the type of operation to be performed is less than a total number of bits that identify the base register or identify the type of operation to be performed in a corresponding instruction, for the same type of operation, that explicitly identifies the base register; and
      the instruction set comprises one or more instructions that identify a global pointer (GP) register as an operand of the instruction;
   decoding, at the decode unit, the received instruction to determine whether the received instruction is one of the one or more instructions from the instruction set that identify the GP register as an operand of the instruction; and
   in response to a determination that the received instruction is one of the one or more instructions from the instruction set that identify the GP register as an operand of the instruction, outputting one or more control signals to cause the execution unit to perform the specified operation with the GP register as an operand when the determination is positive.

2. The method of claim 1 wherein the one or more instructions from the instruction set that identify the GP register as an operand of the instruction comprises one or more displacement memory access instructions that identify the GP register as a base register of the instruction, and when the received instruction is one of the one or more displacement memory access instructions, the one or more control signals cause the execution unit to perform an access of an address of the global memory based on the address stored in the GP register and an offset specified in the received instruction.

3. The method of claim 2 wherein the one or more displacement memory access instructions comprise one or more load instructions.

4. The method of claim 3 wherein the one or more load instructions from the instruction set comprise a first load instruction to load data of a first size from the global memory and a second load instruction to load data of a second size from the global memory.

5. The method of claim 4 wherein the first load instruction has a different number of offset bits than the second load instruction.

6. The method of claim 3 wherein the one or more load instructions comprise at least two load instructions with different bit lengths.

7. The method of claim 3 wherein the one or more load instructions comprise one or more load instructions to load data into a first type of register and one or more load instructions to load data into a second type of register.

8. The method of claim 2 wherein the one or more displacement memory access instructions comprise one or more store instructions.

9. The method of claim 8 wherein the one or more store instructions comprise a first store instruction to store data of a first size in the global memory and a second store instruction to store data of a second size in the global memory.

10. The method of claim 9 wherein the first store instruction has a different number of offset bits than the second store instruction.

11. The method of claim 8 wherein the one or more store instructions comprise at least two store instructions with different bit lengths.

12. The method of claim 2 wherein a number of bits of the received instruction allocated to the offset is greater than a number of bits allocated to an offset in a corresponding displacement memory access instruction that explicitly identifies a base register.

13. The method of claim 1 wherein the one or more instructions from the instruction set that identify the global pointer register as an operand of the instruction does identification implicitly.

14. The method of claim 1 wherein the one or more instructions from the instruction set that identify the GP register as an operand of the instruction comprise one or more register arithmetic instructions that identify the GP register as a source register of the instruction.

15. The method of claim 14 wherein the one or more register arithmetic instructions comprise a first register arithmetic instruction to add an immediate in a first unit to the address of the GP register and a second register arithmetic instruction to add an immediate in a second unit to the address of the GP register.

16. The method of claim 14 wherein the one or more register arithmetic instructions comprise at least two register arithmetic instructions with different bit lengths.

17. The method of claim 1 wherein the instruction set further comprises one or more instructions that identify a program counter as an operand of the instruction; and the method further comprises:
    determining whether the received instruction is one of the one or more instructions that identify the program counter as an operand of the instruction; and
    outputting one or more control signals to cause the execution unit to perform the operation with the program counter as an operand when it is determined that the received instruction is one of one or more instructions that identify a program counter as an operand of the instruction.

18. The method of claim 17 wherein the one or more instructions that identify the program counter as an operand of the instruction comprise an instruction to cause an aligned address at an upper N-bit immediate offset from the program counter to be calculated where N is an integer greater than two.

19. The method of claim 1 wherein the GP register is one of a plurality of general-purpose registers.

20. The method of claim 1 wherein the GP register is a dedicated register separate from one or more general-purpose registers.

21. The method of claim 1, wherein the second instruction comprises an add program counter (ALUIPC) instruction that is configured and disposed to cause the execution unit to compute an aligned address as an upper 20-bit immediate offset from a program counter and store the result in a specified general-purpose register.

22. The method of claim 1, wherein:
    the GP register stores an address of global memory containing a global offset table (GOT) in which data including position-independent code (PIC) is stored; and
    the GP register is set to a start of the GOT in response to a displacement memory access instruction containing an unsigned offset.

23. The method of claim 1, wherein the received instructions implicitly identify the base register based on a pattern of the bits that identify the type of operation to be performed.

24. The method of claim 1, wherein the received instruction further comprises a number of destination bits that explicitly identify a destination for an output of the received instruction.

25. The method of claim 1, wherein:
    the instruction set comprises a plurality of instructions;
    the plurality of instructions comprises at least a first subset of instructions and a second subset of instructions, wherein:
        each instruction in the first subset of instructions and in the second subset of instructions comprises (1) an opcode that implicitly identifies a base register for that instruction and (2) a subopcode;
        the first subset of instructions comprises two or more first instructions, each first instruction having an identical, first opcode and each first instruction corresponding to a different operation;
        the second subset of instructions comprises two or more second instructions, each second instruction having an identical, second opcode that is different than the first opcode, and each second instruction corresponding to a different operation, wherein, for each first instruction and for each second instruction, the operation corresponding to that instruction is specified by (1) the subopcode for that instruction and (2) the opcode that implicitly identifies a base register for that instruction.

26. A computer program product embodied in a non-transitory computer readable medium for decoding instructions, the computer program product comprising code which causes one or more processors to perform operations of:
    receiving, at a decode unit, an instruction in a form for execution by an execution unit that specifies an operation to be performed, the received instruction being an instruction from an instruction set comprising one or more instructions, wherein at a time the received instruction is executed to perform the specified operation:
        the received instruction comprises an opcode that identifies the type of operation to be performed;
        the received instruction implicitly identifies a base register for the instruction;
        a total number of bits in the received instruction that implicitly identify the base register or identify the type of operation to be performed is less than a total number of bits that identify the base register or identify the type of operation to be performed in a corresponding instruction, for the same type of operation, that explicitly identifies the base register; and
        the instruction set comprises one or more instructions that identify a global pointer (GP) register as an operand of the instruction;
    decoding, at the decode unit, the received instruction to determine whether the received instruction is one of the one or more instructions that identify the GP register as an operand of the instruction; and
    in response to a determination that the received instruction is one of the one or more instructions from the instruction set that identify the GP register as an operand of the instruction, outputting one or more control signals to cause the execution unit to perform the specified operation with the GP register as an operand when the determination is positive.

27. A data processing apparatus comprising:
    a register file comprising a GP register, the GP register configured to store an address of global memory in which data is stored;
    an execution unit; and
    a decode unit configured to:
        receive an instruction in a form for execution by the execution unit that specifies an operation to be performed, the received instruction being an instruction from an instruction set comprising one or more instructions, wherein at a time the received instruction is executed to perform the specified operation:
            the received instruction comprises an opcode that identifies the type of operation to be performed;
            the received instruction implicitly identifies a base register for the instruction;
            a total number of bits in the received instruction that implicitly identify the base register or identify the type of operation to be performed is less than a total number of bits that identify the base register or identify the type of operation to be performed in a corresponding instruction, for the same type of operation, that explicitly identifies the base register; and the instruction set comprises one or more instructions that identify the GP register as an operand of the instruction;

determine whether the received instruction is one of the one or more instructions that identify the GP register as an operand of the instruction; and in response to a determination that the received instruction is one of the one or more instructions from the instruction set that identify the GP register as an operand of the instruction, output one or more control signals to cause the execution unit to perform the specified operation with the GP register as an operand when the determination is positive.

* * * * *